United States Patent
Sekine et al.

(10) Patent No.: US 9,162,677 B2
(45) Date of Patent: Oct. 20, 2015

(54) ADAPTIVE CRUISE CONTROL APPARATUS

(71) Applicant: HONDA MOTOR CO., LTD, Tokyo (JP)

(72) Inventors: Hiroshi Sekine, Wako (JP); Yoichi Sugimoto, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 133 days.

(21) Appl. No.: 13/799,716

(22) Filed: Mar. 13, 2013

(65) Prior Publication Data

US 2013/0261889 A1 Oct. 3, 2013

(30) Foreign Application Priority Data

Mar. 30, 2012 (JP) .................. 2012-078623

(51) Int. Cl.
 B60W 30/14 (2006.01)
 B60W 50/08 (2012.01)
 B60K 26/02 (2006.01)

(52) U.S. Cl.
 CPC ........... *B60W 30/143* (2013.01); *B60W 50/085* (2013.01); *B60K 26/021* (2013.01); *B60W 2540/10* (2013.01); *B60W 2540/12* (2013.01); *B60W 2720/10* (2013.01)

(58) Field of Classification Search
 CPC ........... B60W 30/143; B60W 50/085; B60W 2540/12; B60W 2540/10; B60W 2720/10; B60K 26/021
 See application file for complete search history.

(56) References Cited

U.S. PATENT DOCUMENTS

| | | | | |
|---|---|---|---|---|
| 6,283,240 | B1 * | 9/2001 | Beever .................... | 180/178 |
| 7,715,971 | B2 * | 5/2010 | Okuda et al. .............. | 701/93 |
| 8,626,424 | B2 * | 1/2014 | Schwalm et al. ........... | 701/110 |
| 2004/0195022 | A1 * | 10/2004 | Inoue ..................... | 180/170 |
| 2005/0096183 | A1 | 5/2005 | Watanabe et al. | |
| 2013/0173113 | A1 * | 7/2013 | Takiguchi et al. .......... | 701/36 |

FOREIGN PATENT DOCUMENTS

| | | |
|---|---|---|
| JP | 2004-142688 A | 5/2004 |
| JP | 2004-306690 A | 11/2004 |
| JP | 2006-123586 A | 5/2006 |
| JP | 2011-000935 A | 1/2011 |

* cited by examiner

*Primary Examiner* — John Q Nguyen
*Assistant Examiner* — Alan D Hutchinson
(74) *Attorney, Agent, or Firm* — Westerman, Hattori, Daniels & Adrian, LLP

(57) ABSTRACT

A cruise control apparatus includes a current speed detector detects a current speed of a vehicle; a target speed setting unit sets a target speed of the vehicle; an acceleration and deceleration operation amount acquisition unit acquires an operation amount of acceleration or deceleration of the vehicle by a driver; and a cruise controller performs cruise control of the vehicle so that the current speed follows the target speed. The target speed setting unit monitors i) the operation amount or ii) change in the current speed detected by the current speed detector to performs a first determination of if the driver intends to maintain the vehicle speed at an intended speed different from the target speed, and if the first determination is positive, updates the target speed to the intended vehicle speed.

10 Claims, 12 Drawing Sheets

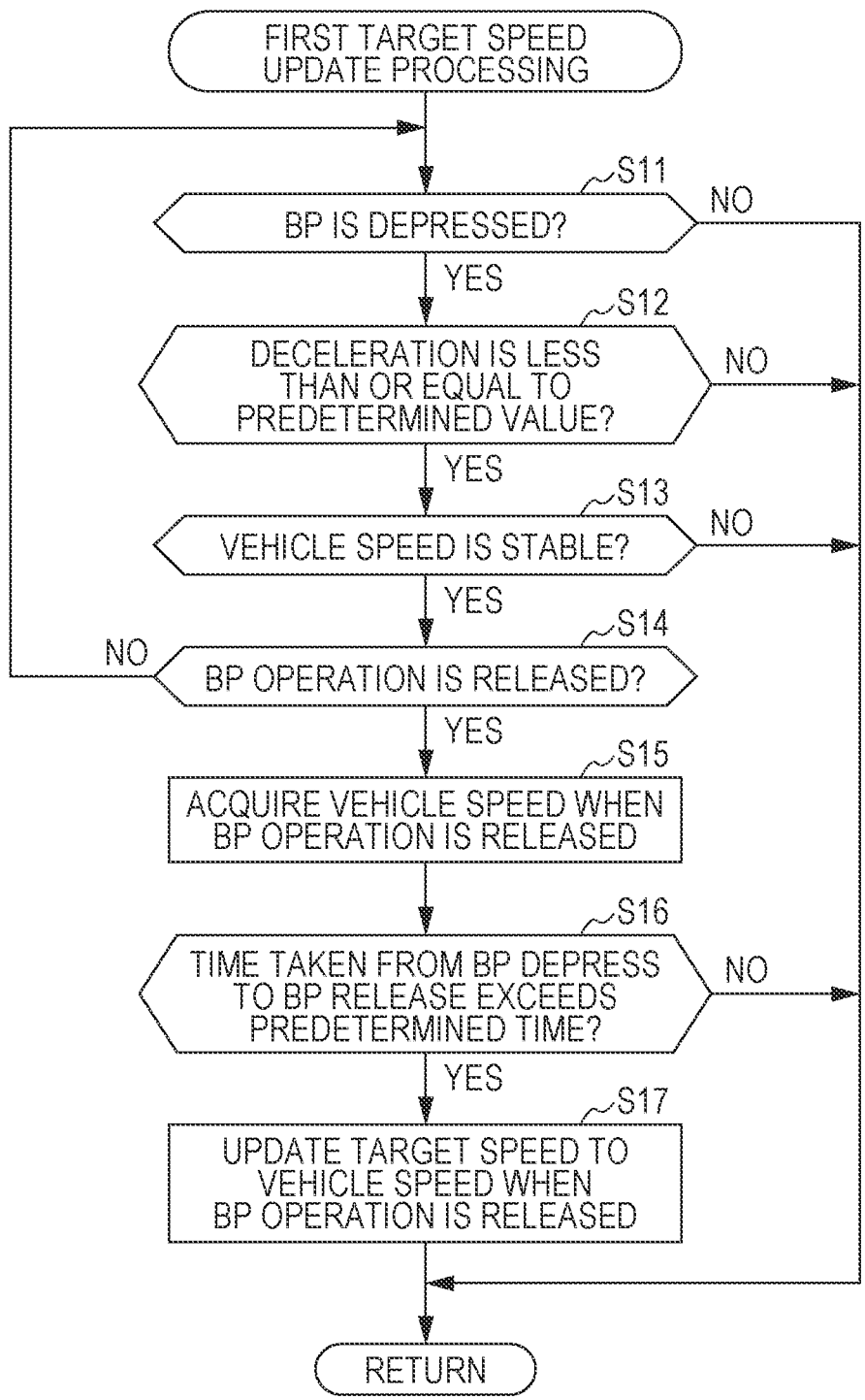

LONG ROAD WITH DOWN SLOPE

FLAT ROAD WITHOUT CURVE

FLAT ROAD WITHOUT CURVE

LONG WINDING ROAD
WITH DOWN SLOPE

LONG WINDING ROAD
WITH DOWN SLOPE

ADAPTIVE CRUISE CONTROL APPARATUS

CROSS REFERENCES TO RELATED APPLICATIONS

The present application claims priority under 35 U.S.C. §119 to Japanese Patent Application No. 2012-78623, filed Mar. 30, 2012, entitled "Cruise Control Apparatus." The contents of this application are incorporated herein by reference in their entirety.

TECHNICAL FIELD

The present disclosure relates to a cruise control apparatus which controls a vehicle so that the current speed of the vehicle follows a target speed.

BACKGROUND

Cruise control apparatuses for controlling the current speed of a vehicle at a target speed have been developed in the past. The assignee has proposed a cruise control apparatus including a cruise control unit and a target speed correction unit as an example of such a cruise control apparatus (see Japanese Unexamined Patent Application Publication No. 2006-123586).

In the cruise control apparatus according to Japanese Unexamined Patent Application Publication No. 2006-123586, the cruise control unit controls acceleration and deceleration of a vehicle so as to maintain a predetermined target speed. When release of an accelerating operation by a driver, or reduction in amount of an accelerating operation, for example, release of an accelerator pedal operation, or depress back of an accelerator pedal is detected in a state where the current speed of the vehicle is greater than an appropriate speed for a curved road under cruise control, the target speed correction unit determines that the driver intends to decelerate the vehicle, and updates the target speed of the cruise control to the appropriate speed for a curved road upon the above detection. The cruise control apparatus according to Japanese Unexamined Patent Application Publication No. 2006-123586 can cooperatively and appropriately control the operation of the cruise control apparatus and a safety device when a vehicle is running along a curved road while performing cruise control.

SUMMARY

Now, in the cruise control technology according to Japanese Unexamined Patent Application Publication No. 2006-123586, when a vehicle is running along a curved road while performing cruise control, geometric values of the curve, including a length, a curvature of the curve, and a turning angle when the vehicle is passing through the curve is estimated, and an appropriate speed for passing through the curve is calculated based on the estimated geometric values of the curve, the calculated appropriate speed is set as a target speed of the cruise control at the timing when release of an accelerating operation or reduction of amount of an accelerating operation by a driver (that is to say, deceleration intention of the driver) is detected.

However, according to the study of the inventors, it has been found that an appropriate speed for passing through a curved road tends to be quite varied depending on not only the geometric values of the curve, but also factors such as the attribute of a driver of whether the driver is a novice or an experienced driver, driving characteristics of whether a driver is courageous or cautious, road surface conditions according to the weather (rain, snow, or clear sky), and the slope of a road (an ascending road or descending road). For this reason, there is a possibility that the appropriate speed (target speed) for a curved road which is calculated based on the geometric values of the curve does not necessarily reflect the intention of a driver, and thus an appropriate cruise control function may not be implemented.

In view of the aforementioned findings, it is preferable to achieve an appropriate cruise control function irrespective of the attribute, driving characteristics of a driver.

Preferably, in the first aspect, a cruise control apparatus includes a current speed detector configured to detect a current speed of a vehicle; a target speed setting unit configured to set a target speed of the vehicle; an acceleration and deceleration operation amount acquisition unit configured to acquire an operation amount of acceleration or deceleration of the vehicle by a driver; and a cruise controller configured to perform cruise control of the vehicle so that the current speed follows the target speed. The target speed setting unit monitors i) the operation amount acquired by the acceleration and deceleration operation amount acquisition unit or ii) change in the current speed detected by the current speed detector to perform a first determination of if the driver intends to maintain the vehicle speed at an intended speed different from the target speed, and if the first determination is positive, updates the target speed to the intended vehicle speed.

According to the first aspect, a driver's intention of maintaining at a speed different from the target speed can be reflected to the target speed, and thus an appropriate cruise control function can be achieved irrespective of the attribute of the driver of whether the driver is a novice or an experienced driver, or driving characteristics of whether the driver is courageous or cautious.

Preferably, in the second aspect, the target speed setting unit performs a second determination of if an absolute value of a difference between the target speed and the current speed detected by the current speed detector exceeds a predetermined threshold value and performs a third determination of if a change in the vehicle speed is maintained in a predetermined range for more than a predetermined time interval, and if both of the second and third determinations are positive, the target speed setting unit decides the first determination is positive.

According to the second aspect, the target speed is updated to the current speed when a driver has an intention to maintain at a speed different from the target speed, and the absolute value of the difference between the current speed and the target speed exceeds a predetermined value and the change in the vehicle speed is maintained in a predetermined range for more than a predetermined time interval, and thus appropriate cruise control function can be achieved in which the intention of the driver is reflected to the target speed.

Preferably, in the third aspect, the target speed setting unit performs a fourth determination of if the operation amount acquired by the acceleration and deceleration operation amount acquisition unit exceeds a predetermined value and is maintained in a predetermined range for more than a predetermined time interval, and if the fourth determination is positive, the target speed setting unit decides the first determination is positive.

According to the third aspect, an acceleration/deceleration intention of a driver can be reflected to the target speed when an operation amount acquired by the acceleration and deceleration operation amount acquisition unit is maintained in a predetermined range exceeding a predetermined value for more than a predetermined time interval, and thus an appropriate cruise control function can be achieved irrespective of the attribute of the driver of whether the driver is a novice or an experienced driver, or driving characteristics of whether the driver is courageous or cautious.

Preferably, in the fourth aspect, the cruise controller performs cruise control of the vehicle such that the cruise control starts upon detecting that the acceleration operation or the deceleration operation is deactivated, and the cruise control stops upon detecting that the deceleration operation or the acceleration operation is activated.

According to the fourth aspect, the cruise control is stopped while a driver performs an accelerating operation or a decelerating operation, and thus it is possible to prevent cruise control against the driver's intention according to the accelerating operation or the decelerating operation.

Preferably, in the fifth aspect, when the fourth determination is positive, the target speed setting unit further performs a fifth determination if the operation amount decreases to reach a value equal to or less than the predetermined value, and if the fifth determination is positive, the target speed setting unit updates the target speed to the vehicle speed detected at the time of the positive fifth determination.

According to the fifth aspect, cruise control function which appropriately reflects a driver's intention of driving can be achieved.

Preferably, in the sixth aspect, the operation amount acquired by the acceleration and deceleration operation amount acquisition unit is an amount of brake operation for deceleration of the vehicle by a driver, and when the amount of brake operation is maintained in a predetermined range exceeding a predetermined value for more than a predetermined time interval, and then brake operation is released, the target speed setting unit updates the target speed to the vehicle speed when the brake operation is released.

According to the sixth aspect, cruise control function which appropriately reflects a driver's intention of driving immediately after the driver's decelerating operation can be achieved.

Preferably, in the seventh aspect, the operation amount acquired by the acceleration and deceleration operation amount acquisition unit is an amount of accelerator operation for acceleration of the vehicle by a driver, and when the amount of accelerator operation is maintained in a predetermined range exceeding a predetermined value for more than a predetermined time interval, and then the accelerator operation is released, the target speed setting unit updates the target speed to the vehicle speed when the accelerator operation is released.

According to the seventh aspect, cruise control function which appropriately reflects a driver's intention of driving immediately after the driver's accelerating operation can be achieved.

Preferably, in the eighth aspect, the cruise control apparatus further includes a curved road detection unit configured to detect a curved road ahead in driving direction of the vehicle. When the curved road detection unit detects that the vehicle has entered a curved road, and the operation amount acquired by the acceleration and deceleration operation amount acquisition unit exceeds a predetermined value, and then the operation is released, the target speed setting unit updates the target speed to the vehicle speed detected when the operation is released.

According to the eighth aspect, it is possible to achieve cruise control function which appropriately reflects a driver's intention while driving through a curved road irrespective of the attribute of the driver of whether the driver is a novice or an experienced driver, or driving characteristics of whether the driver is courageous or cautious.

Preferably, in the ninth aspect, the cruise control unit, which can control engine braking or regenerative braking, and a brake device, performs deceleration control using the engine braking or the regenerative braking when the current vehicle speed detected by the current speed detection unit is higher than the target speed which is updated by the target speed setting unit, and performs brake control using the brake device when the current vehicle speed after performing the deceleration control continuously for a predetermined time is higher than the target speed.

According to the ninth aspect, brake control is performed stepwise in ascending order of brake performance, and thus smooth brake control of a vehicle can be achieved.

Preferably, in the tenth aspect, the cruise control apparatus further includes a reaction force control unit configured to provide an accelerator pedal with a footrest function by increasing a reaction force when the accelerator pedal is depressed to a predetermined depressed position. The reaction force control unit does not provide the accelerator pedal with the footrest function while cruise control of the vehicle is not performed by the cruise control unit, but provides the accelerator pedal with the footrest function while cruise control of the vehicle is performed by the cruise control unit.

According to the tenth aspect, the reaction force control unit provides the accelerator pedal with a footrest function while cruise control of the vehicle is performed by the cruise control unit, and thus it is possible to implement a cruise control apparatus which can reduce the operational burden of a driver during the cruise control.

Preferably, in the eleventh aspect, the reaction force control unit provides the accelerator pedal with the footrest function, the predetermined depressed position being a depressed accelerator pedal position corresponding to the target speed set by the target speed setting unit.

According to the eleventh aspect, the reaction force control unit provides the accelerator pedal with a footrest function while cruise control of the vehicle is performed by the cruise control unit, where the predetermined depressed position is a depressed accelerator pedal position corresponding to the target speed set by the target speed setting unit, and thus it is possible to implement a cruise control apparatus which can reduce the operational burden of a driver, and has an excellent operability in terms of capability of quickly reflecting a driver's intention of acceleration.

Preferably, in the twelfth aspect, the operation amount acquired by the acceleration and deceleration operation amount acquisition unit is an amount of accelerator operation for acceleration of the vehicle by a driver, and when an operation amount of depressing the accelerator pedal exceeding a predetermined depressed position is acquired by the acceleration and deceleration operation amount acquisition unit, the target speed setting unit updates the target speed to the speed of the vehicle based on the operation amount.

According to the twelfth aspect, when an operation amount of depressing the accelerator pedal acquired by the acceleration and deceleration operation amount acquisition unit exceeds a predetermined depressed position, the target speed setting unit updates the target speed to a vehicle speed based on the operation amount, and thus it is possible to implement a cruise control apparatus which is equipped with an accelerator pedal having a footrest function. Here, the amount of brake operation may be e.g, an amount of depressing a brake pedal and the amount of accelerator operation may be e.g., an amount of depressing an accelerator pedal. However, these are non-limiting examples.

BRIEF DESCRIPTION OF THE DRAWINGS

The advantages of the disclosure will become apparent in the following description taken in conjunction with the following drawings.

FIG. 2B is a flowchart illustrating first target speed update processing performed by a target speed setting unit of the cruise control apparatus according to the first embodiment.

DETAILED DESCRIPTION

Hereinafter, a cruise control apparatus 11 according to first to third embodiments of the present disclosure will be described in detail with reference to the accompanying drawings.

Figure 1:
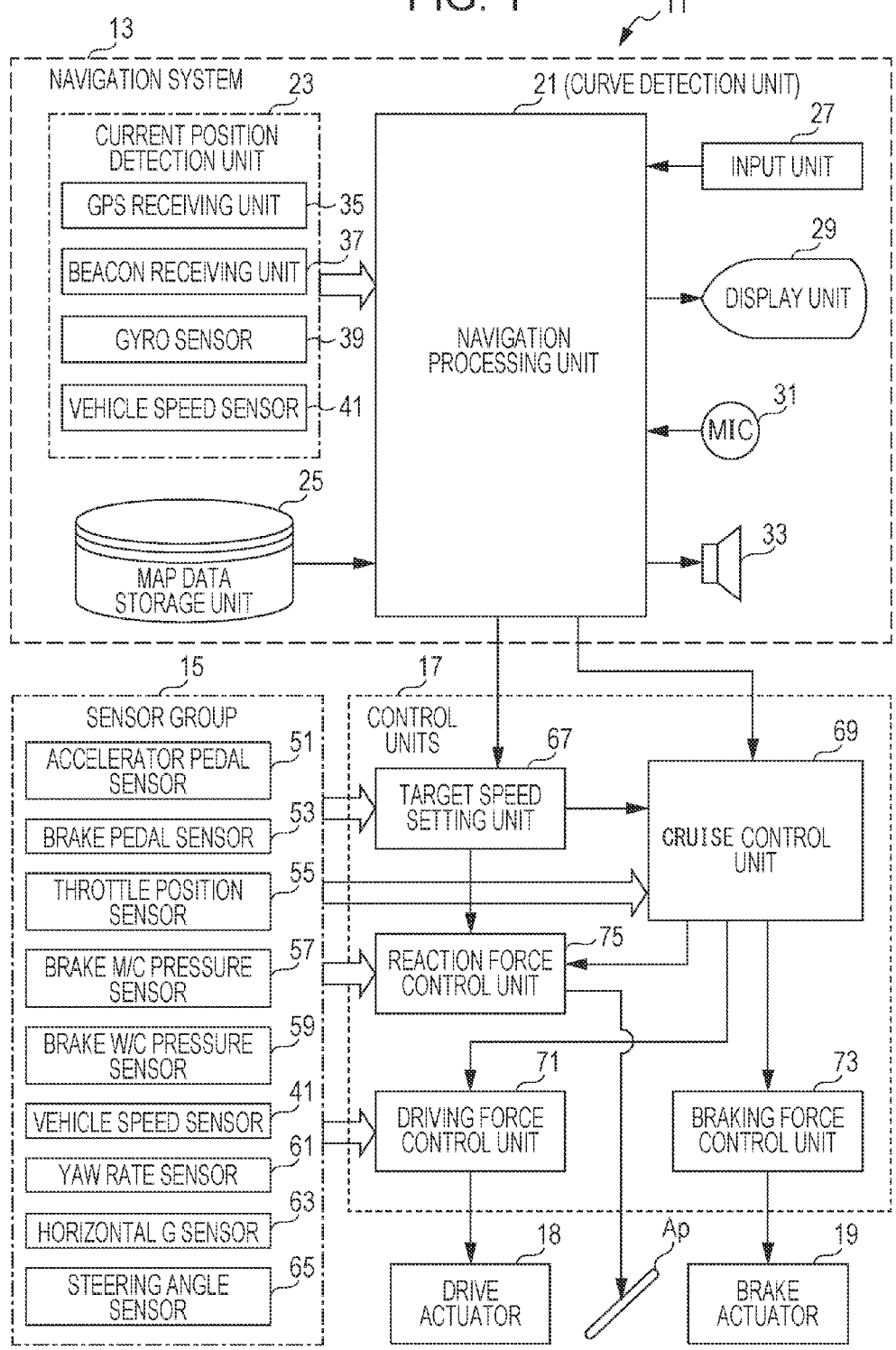
FIG. 1 is a functional block diagram of a cruise control apparatus which is commonly used in first to third embodiments of the present disclosure.

Configuration of Cruise Control System 11 According to First to Third Embodiments of Present Disclosure First, the configuration of the cruise control apparatus 11 according to the first to third embodiments of the present disclosure will be described with reference to FIG. 1. FIG. 1 is a functional block diagram of the cruise control apparatus 11 which is commonly used in the first to third embodiments of the present disclosure.

As illustrated in FIG. 1, the cruise control apparatus 11 according to the first to third embodiments of the present disclosure includes a navigation system 13, a sensor group 15, control units 17, a drive actuator 18, and a brake actuator 19.

As illustrated in FIG. 1, the navigation system 13 includes a navigation processing unit 21, a current position detection unit 23, a map data storage unit 25, an input unit 27, a display unit 29, a microphone 31, and a loudspeaker 33.

The navigation processing unit 21 corresponding to the "curve detection unit" or "curved road detection unit" in the present disclosure has, for example, a function of mapping a current position of a vehicle on the map data acquired from the map data storage unit 25, the current position being detected by the current position detection unit 23, a function of displaying a mark on the display screen of the display unit 29, the mark indicating the current position of the vehicle which is mapped on map data, and functions of detecting a curve or a curved road ahead in the moving direction of the vehicle and performing an operation such as route search or route guidance for the vehicle, then displaying, on the display screen of the display unit 29, for example, route information to a destination and various types of additional information in addition to the map data acquired from the map data storage unit 25.

The navigation processing unit 21 includes a microcomputer (hereinafter referred to as a "micom") which (not illustrated) has a CPU (Central Processing Unit), a ROM (Read Only Memory), a RAM (Random Access Memory), or the like. The micom reads and executes a program stored in the ROM to perform a control according to the various functions of the navigation processing unit 21, for example, such as described herein.

The current position detection unit 23 has a function of detecting the current position of a vehicle equipped with the cruise control apparatus 11 by full use of positioning function of autonomous navigation and satellite navigation. In order to achieve the function, the current position detection unit 23 includes a GPS receiving unit 35, a beacon receiving unit 37, a gyro sensor 39, and a vehicle speed sensor 41. The vehicle speed sensor 41 corresponds to the "current speed detection unit" of the present disclosure.

The GPS receiving unit 35 has a function of receiving a positioning signal, for example, such as a GPS (Global Positioning System) signal for measuring the position of a vehicle utilizing a satellite, or a D (Differential) GPS signal for which an error in GPS signal is corrected and has an improved positioning accuracy. The beacon receiving unit 37 has a function of receiving position information sent from a beacon (not illustrated) which is provided on a road.

The gyro sensor 39 has a function of detecting an inclined angle with respect to any of the moving direction of the vehicle and the vertical direction. The vehicle speed sensor 41 has a function of detecting the speed of the vehicle.

The map data storage unit 25 includes a computer-readable storage medium, for example, a magnetic disk device such as a hard disk drive device, or an optical disk device such as a CD-ROM, a CD-R, an MO, and a DVD. The map data storage unit 25 has a function of storing road data which is map data to be displayed on the display screen of the display unit 29, the road data including, for example, data of widths of roads, angles, shapes, position of curved roads and positions of the intersections of a plurality of roads.

The input unit 27 includes various types of switches and keyboards. The input unit 27 is used when an operational intention of an operator is inputted. The display unit 25 has a function of displaying a map along with the current position of the vehicle on the display screen. The microphone 31 is used when a voice of an operational intention of an operator is inputted. The loudspeaker 33 is used, for example, when a driver is guided to a route to a destination by voice.

As illustrated in FIG. 1, the sensor group 15 includes an accelerator pedal sensor 51, a brake pedal sensor 53, a throttle position sensor 55, a brake master cylinder pressure sensor (hereinafter simply referred to as "brake M/C pressure sensor") 57, a brake wheel cylinder pressure sensor (hereinafter simply referred to as "brake W/C pressure sensor") 59, the above-mentioned vehicle speed sensor 41, a yaw rate sensor 61, a horizontal G sensor 63, and a steering angle sensor 65.

The accelerator pedal sensor 51 has a function of detecting the amount of operation of an accelerator pedal Ap by a driver. The brake pedal sensor 53 has a function of detecting the amount of operation of a brake pedal (not illustrated) by a driver. The throttle position sensor 55 has a function of detecting a throttle opening. The brake M/C pressure sensor 57 has a function of detecting the brake fluid pressure of a master cylinder (not illustrated). The brake W/C pressure sensor 59 has a function of detecting the brake fluid pressure of a wheel cylinder (not illustrated). The yaw rate sensor 61 has a function of detecting the yaw rate (change in rotational speed in a turning direction) of the vehicle. The horizontal G sensor 63 has a function of detecting the acceleration (horizontal G) generated in the horizontal direction of the vehicle when passing through a curve. The steering angle sensor 65 has a function of detecting the steering angle of the front wheels (not illustrated). The accelerator pedal sensor 51 and the brake pedal sensor 53 each correspond to "acceleration and deceleration operation amount acquisition unit" of the present disclosure.

For example, the control unit 17 built in an ECU (Engine Control Unit) includes a target speed setting unit 67, a cruise control unit 69, a driving force control unit 71, a braking force control unit 73, and a reaction force control unit 75 as illustrated in FIG. 1. The control unit 17 includes a micom which is equipped with a CPU (Central Processing unit), a ROM (Read Only Memory), and/or a RAM (Random Access Memory). The micom reads and executes a program stored in the ROM to perform a control according to various functions including the target speed setting function and the cruise control function of the control unit 17.

The target speed setting unit 67 has a function of setting a target speed of the vehicle. The "target speed" means a target speed which the driving speed of the vehicle follows. Specifically, for example, when an amount of brake operation or an amount of accelerator operation, which is acquired by the acceleration and deceleration operation amount acquisition unit (the accelerator pedal sensor 51 and the brake pedal sensor 53) is maintained in a predetermined range exceeding a predetermined value for more than a predetermined time interval, and then the operation is released, the target speed setting unit 67 updates the target speed to the speed of the vehicle when the operation is released based on the assumption that a driver has an intention to maintain the cruising speed at the vehicle speed when the operation is released.

The cruise control unit 69 has a function of performing cruise control of the vehicle so that the current speed of the vehicle follows the target speed. The current speed of the vehicle follows the target speed means that an error between the current speed of the vehicle and the target speed falls, for example, within a predetermined value (for example, 5 km/h which can be changed as needed). The cruise control unit 69 has a function of performing cruise control of the vehicle such that the cruise control starts when an accelerating operation (accelerator operation) or a decelerating operation (brake operation) is deactivated, and the cruise control stops when a decelerating operation (brake operation) or an accelerating operation (accelerator operation) is activated. The reason why the cruise control is started and stopped in this manner is that if the cruise control is allowed while a driver is performing an accelerating operation or a decelerating operation, the cruise control may be performed against the driver's intention according to the accelerating operation or the decelerating operation.

The driving force control unit 71 has a function of controlling a driving force for driving the vehicle. The driving force control unit 71 is connected to the drive actuator 18 which actuates mechanical parts for providing a driving force to the vehicle. The driving force control unit 71 operates to control the operation of the drive actuator 18 according to a command from the cruise control unit 69.

Here, for example, a throttle valve and/or an intake valve (both not illustrated) which controls the amount of intake air of the engine (not illustrated) may be used as the mechanical parts for providing a driving force to the vehicle. The driving force control unit 71 can control the intake air of the engine, in other words, the driving force of the engine by making adjustment of one or both of opening of the throttle valve and lift amount of the intake valve.

In the case of a vehicle which uses a driving force of a motor in addition to a driving force of an engine like a hybrid vehicle, a motor may be used as the above-mentioned mechanical part. In this case, the driving force of the engine can be controlled by adjusting the rotational speed of the motor.

The braking force control unit 73 has a function of controlling a braking force for stopping the vehicle. The braking force control unit 73 is connected to the brake actuator 19 which actuates mechanical parts for providing a braking force to the vehicle. The braking force control unit 73 operates to control the operation of the brake actuator 19 according to a command from the cruise control unit 69.

Here, for example, a hydraulic brake device and/or an electric parking brake (both not illustrated) may be used as the mechanical parts for providing a braking force to the vehicle. The braking force control unit 73 can control the braking force of the vehicle by making adjustment of one or both of the hydraulic pressure of the hydraulic brake device and activation/deactivation of the electric parking brake.

The braking force control unit 73 may have a configuration in which engine brake (when an internal combustion engine is included as the driving source) and regenerative brake (when a motor is included as the driving source) may be controlled. In this case, control of the engine brake can be achieved by the brake actuator 19 making adjustment of one or both of opening of the throttle valve and lift amount of the intake valve. On the other hand, control of regeneration brake can be achieved by the brake actuator 19 making adjustment of the rotational speed of the motor.

The reaction force control unit 75 has a function of providing the accelerator pedal Ap with a footrest function by increasing a reaction force when the accelerator pedal Ap (see FIG. 1) is depressed to a predetermined depressed position. Specifically, the reaction force control unit 75 does not provide the accelerator pedal Ap with a footrest function while the cruise control of the vehicle is not performed by the cruise control unit 69, but provides the accelerator pedal Ap with a footrest function while the cruise control of the vehicle is performed by the cruise control unit 69 where the above-mentioned predetermined depressed position is a depressed accelerator pedal Ap position corresponding to the target speed set by the target speed setting unit 67.

The cruise control apparatus 11 according to the first to third embodiments of the present disclosure in the above configuration includes an operation switch (not illustrated) which is used for selectively setting whether the cruise control function is enabled or disabled. Hereinafter, description will be given under the assumption an operation switch for enabling cruise control function has been set unless otherwise stated.

Figure 2A:
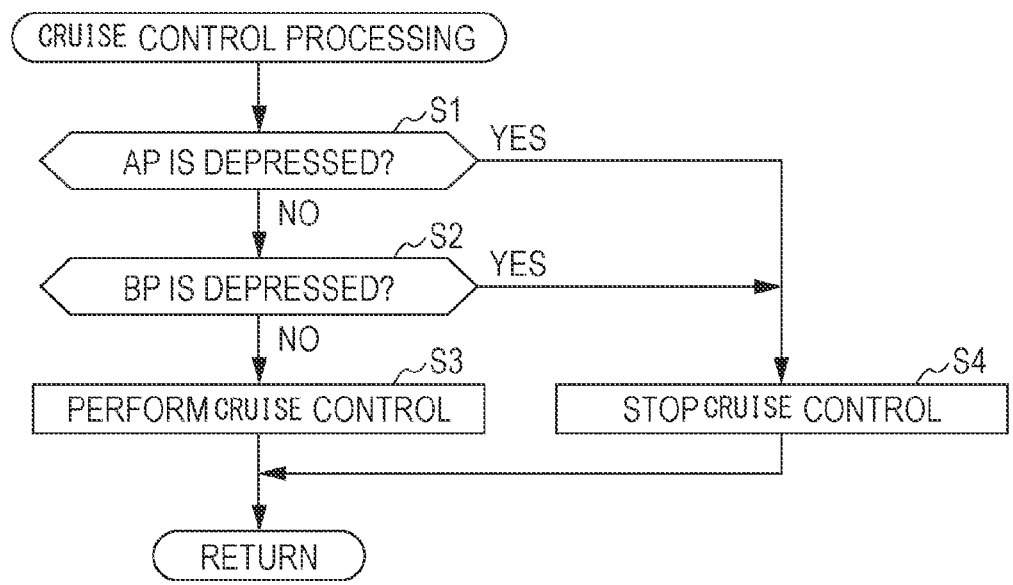
FIG. 2A is a flowchart illustrating the flow of the cruise control processing performed by the cruise control apparatus which is commonly used in the first to third embodiments.

Basic Operation of Cruise Control System 11 According to First to Third Embodiments of Present Disclosure Next, the basic operation of the cruise control apparatus 11 according to the first to third embodiments of the present disclosure will be described with reference to FIG. 2A. FIG. 2A is a flowchart illustrating the flow of the cruise control processing performed by the cruise control apparatus 11 which is commonly used in the first to third embodiments of the present disclosure.

In step S1 illustrated in FIG. 2A, the cruise control unit 69 determines whether or not an accelerator pedal ("Ap" in FIG. 2A and the following figures means the accelerator pedal) has been depressed based on the accelerator operation amount (the operation amount of depressing the accelerator pedal Ap) which is acquired by the accelerator pedal sensor 51.

When it is determined that the accelerator pedal Ap has been depressed as a result of the determination in step S1 ("Yes" in step S1), the cruise control unit 69 proceeds the process to step S4.

On the other hand, when it is determined that the accelerator pedal Ap has not been depressed as a result of the determination in step S1 ("No" in step S1), the cruise control unit 69 proceeds the process to step S2.

In step S2, the cruise control unit 69 determines whether or not the brake pedal ("Bp" in FIG. 2A and the following figures means the brake pedal) has been depressed based on the brake operation amount (the operation amount of depressing the brake pedal Bp) which is acquired by the brake pedal sensor 53.

When it is determined that the brake pedal Bp has been depressed as a result of the determination in step S2 ("Yes" in step S2), the cruise control unit 69 proceeds the process to step S4.

On the other hand, when it is determined that the brake pedal has not been depressed as a result of the determination in step S2 ("No" in step S2), the cruise control unit 69 proceeds the process to step S3.

In step S3, the cruise control unit 69 performs cruise control so that the current speed of the vehicle follows the target speed. After performing the cruise control, the cruise control unit 69 returns the process to step S1, and repeats the subsequent process.

In step S4, the cruise control unit 69 stops the cruise control. That is to say, the cruise control unit 69 stops the cruise control of the vehicle when an accelerating operation (accelerator operation) or decelerating operation (brake operation) is activated. After stopping the cruise control, the cruise control unit 69 returns the process to step S1, and repeats the subsequent process.

That is to say, the cruise control apparatus 11 according to the first to third embodiments of the present disclosure performs cruise control of the vehicle such that the cruise control starts under the condition that an accelerating operation or a decelerating operation is deactivated (a state in which an accelerator operation is released or a brake operation is released), and the cruise control stops under the condition that an accelerating operation or a decelerating operation is activated (a state in which an accelerator operation is performed or a brake operation is performed). Accordingly, the cruise control is stopped while a driver performs an accelerating operation or a decelerating operation, and thus it is possible to prevent cruise control against the driver's intention according to the accelerating operation or the decelerating operation.

It is to be noted that deactivation of an accelerating operation includes a state in which the operation amount of the accelerator pedal Ap is less than or equal to a predetermined amount, in addition to a state in which an accelerator operation is released. Similarly, deactivation of a decelerating operation includes a state in which the operation amount of the brake pedal is less than or equal to a predetermined amount, in addition to a state in which a brake operation is released.

The basic operation according to step S1 to S4 is common fundamentally regardless of the driving environment of the vehicle, for example, whether the vehicle is running on an ascending or down slope, whether the vehicle is running on a straight or curved road, whether the vehicle is running on a paved or unpaved road, or whether the road surface is dry, wet, or covered with snow.

In the cruise control apparatus 11 according to the present disclosure, the target speed setting unit 67 selectively performs appropriate processing out of the first to third target speed update processing according to whether the driving road of the vehicle is an ascending road, a descending road, a curved road, or a flat road without a curve, or whether a driver intends to accelerate or decelerate the vehicle. Hereinafter, the details will be described.

Operation of Cruise Control System 11 According to First Embodiment of Present Disclosure Next, the operation of cruise control apparatus 11 according to the first embodiment of the present disclosure will be described with reference to FIG. 2B. FIG. 2B is a flowchart illustrating the first target speed update processing performed by the target speed setting unit 67 of the cruise control apparatus 11 according to the first embodiment.

In step S11 illustrated in FIG. 2B, the cruise control unit 69 determines whether or not the brake pedal has been depressed based on the brake operation amount which is acquired by the brake pedal sensor 53.

When it is determined that the brake pedal has not been depressed as a result of the determination in step S11 ("No" in step S11), the cruise control unit 69 repeats step S11 until it is determined that the brake pedal is depressed.

On the other hand, when it is determined that the brake pedal has been depressed as a result of the determination in step S11 ("Yes" in step S11), the cruise control unit 69 proceeds the process to step S12. Note, when it is determined in step S11 that the brake pedal has been depressed, the cruise control unit 69 stops the cruise control according to the above-described principle.

In step S12, the cruise control unit 69 determines whether or not a deceleration is less than or equal to a predetermined value, the deceleration being obtained by differentiating in time a vehicle speed detected by the vehicle speed sensor 41. The purpose why the above determination is made in step S12 is to determine whether the depressing of the brake pedal in step S11 is substantially comparable to hard braking. It is to be noted that the determination in step S12 may be omitted. In this configuration, when the determination in step S12 is omitted and it is determined that the brake pedal has been depressed as a result of the determination in step S11 ("Yes" in step S11), the cruise control unit 69 proceeds the process to step S13.

When it is determined that the deceleration is greater than a predetermined value as a result of the determination in step S12 ("No" in step S12), the cruise control unit 69 returns the process to step S11, and repeats the subsequent process.

On the other hand, when it is determined that the deceleration is less than or equal to a predetermined value as a result of the determination in step S12 ("Yes" in step S12), the cruise control unit 69 proceeds the process to step S13.

In step S13, the cruise control unit 69 determines whether or not the speed of the vehicle is stable. The determination is made, for example, by checking whether an error between the current speed and a reference speed is within an acceptable value (for example, 5 km/h which can be changed as needed), the reference speed being the vehicle speed when the brake pedal is depressed ("Yes" in step S11). Specifically, in the case where the vehicle speed when the brake pedal is depressed is 35 km/h, and the acceptable value of error with respect to a reference speed is set to 5 km/h, the vehicle speed is considered to be stable when in a speed range of 30 to 40 km/h (corresponding to a speed range with a predetermined width).

When it is determined that the vehicle speed is not stable as a result of the determination in step S13 ("No" in step S13), the cruise control unit 69 returns the process to step S11, and repeats the subsequent process.

On the other hand, when it is determined that the vehicle speed is stable as a result of the determination in step S13 ("Yes" in step S13), the cruise control unit 69 proceeds the process to step S14.

In step S14, the cruise control unit 69 determines whether or not depressing operation of the brake pedal has been released (including a state in which the brake operation amount is less than or equal to a predetermined value) based on the brake operation amount which is acquired by the brake pedal sensor 53.

When it is determined that depressing operation of the brake pedal has not been released as a result of the determination in step S14 ("No" in step S14), the cruise control unit 69 returns the process to step S11, and repeats the subsequent process.

On the other hand, when it is determined that depressing operation of the brake pedal has been released as a result of the determination in step S14 ("Yes" in step S14), the cruise control unit 69 proceeds the process to step S15. When it is determined in step S14 that depressing operation of the brake pedal has been released, the cruise control unit 69 stops the cruise control according to the above-described principle. In the subsequent step S15 to S17, it is determined whether the last speed or an updated speed is used as the target speed for restarted cruise control.

In step S15, the cruise control unit 69 acquires from the vehicle speed sensor 41 the vehicle speed when depressing operation of the brake pedal is released.

In step S16, the cruise control unit 69 determines whether the time interval from the depressing of the brake pedal (step S11) to the release of the depressing operation is greater than a predetermined time (for example, 3 seconds which can be changed as needed). It is to be noted that the determination in step S16 may be omitted. When the determination in step S16 is omitted, after the processing of step S15, the cruise control unit 69 proceeds the process to step S17.

When it is determined that the time interval from the depressing of the brake pedal to the release of the depressing operation is not greater than a predetermined time as a result of the determination in step S16 ("No" in step S16), the cruise control unit 69 returns the process to step S11, and repeats the subsequent process.

On the other hand, when it is determined that the time interval from the depressing of the brake pedal to the release of the depressing operation is greater than a predetermined time as a result of the determination in step S16 ("Yes" in step S16), the cruise control unit 69 proceeds the process to step S17.

In step S17, the cruise control unit 69 sends a command to the target speed setting unit 67 to update the target speed to the vehicle speed when the depressing operation of the brake pedal is released, the vehicle speed being acquired in step S15. Upon receiving the command, the target speed setting unit 67 updates the target speed to the vehicle speed when the depressing operation of the brake pedal is released, the vehicle speed being acquired in step S15. After the update, the cruise control unit 69 returns the process to step S11, and repeats the subsequent process.

Figure 3A:
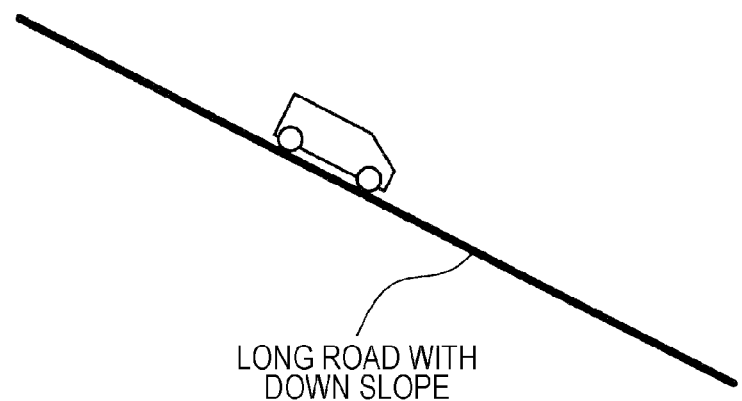
FIG. 3A illustrates a situation in which a vehicle according to a comparative example drives on a long road with a down slope.
Figure 3B:
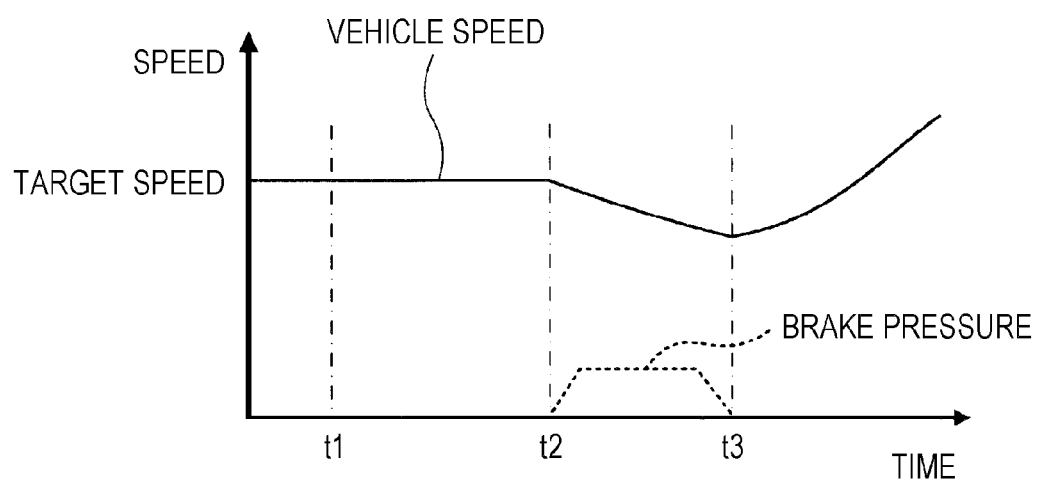
FIG. 3B is a graph for illustrating the operation of a cruise control apparatus mounted in the vehicle according to the comparative example.
Figure 4A:
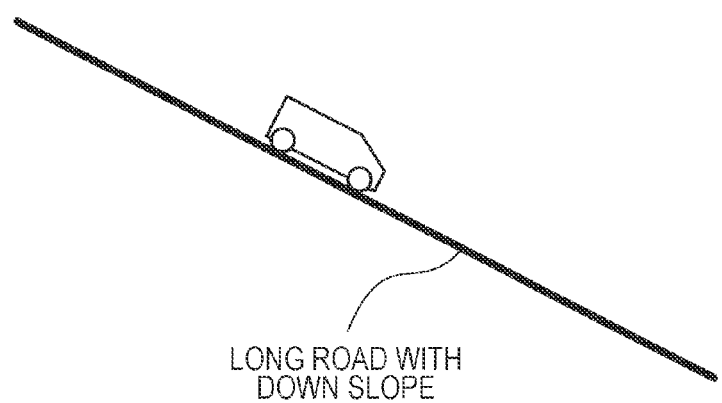
FIG. 4A illustrates a situation in which a vehicle equipped with the cruise control apparatus according to the first embodiment drives on a long road with a down slope.
Figure 4B:
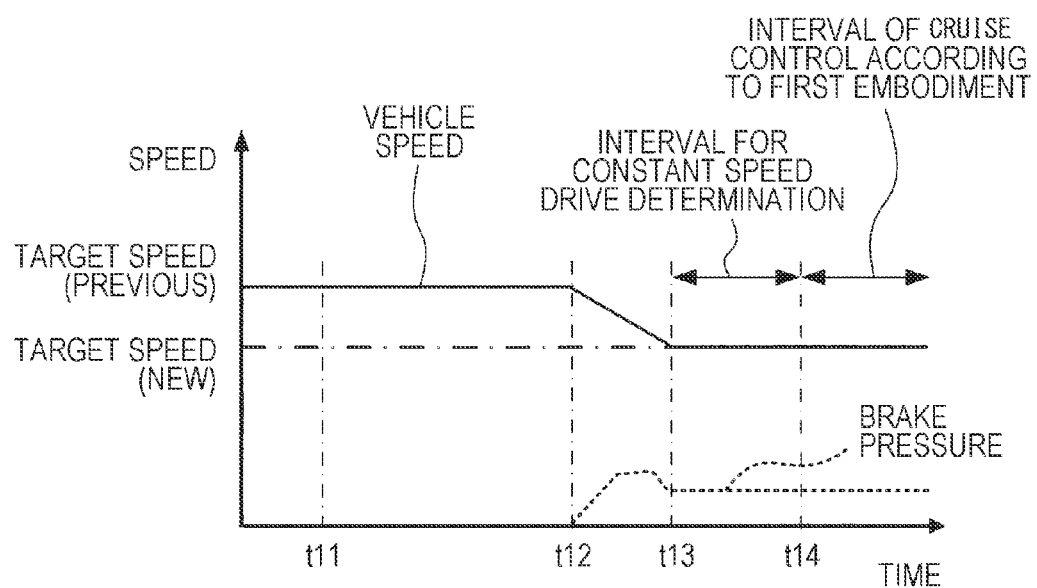
FIG. 4B is a graph for illustrating the operation of the cruise control apparatus according to the first embodiment and mounted in the vehicle illustrated in FIG. 4A.

Detailed Operation of Cruise Control System 11 According to First Embodiment of Present Disclosure Next, more detailed operation of the cruise control apparatus 11 according to the first embodiment of the present disclosure when a vehicle is running on a long road with a down slope will be described with reference to FIGS. 3A, 3B, 4A, and 4B. FIG. 3A illustrates a situation in which a vehicle according to a comparative example drives on a long road with a down slope. FIG. 3B is a graph for illustrating the operation of a cruise control apparatus mounted in the vehicle according to the comparative example. FIG. 4A illustrates a situation in which a vehicle equipped with the cruise control apparatus 11 according to the first embodiment drives on a long road with a down slope. FIG. 4B is a graph for illustrating the operation of the cruise control apparatus 11 according to the first embodiment and mounted in the vehicle illustrated in FIG. 4A.

The cruise control apparatus 11 according to the first embodiment of the present disclosure has a configuration in which when the brake operation amount acquired by the brake pedal sensor 53 (acceleration and deceleration operation amount acquisition unit) is maintained in a predetermined range exceeding a predetermined value for more than a predetermined time interval, and the brake operation is released, the target speed setting unit 67 updates the target speed to the vehicle speed when the brake operation is released.

Here, "when an accelerator or brake operation amount is maintained in a predetermined range exceeding a predetermined value for more than a predetermined time interval" corresponds to a case where an acceleration/deceleration operation by a driver is temporarily completed, and the driver has an intention to maintain the cruising speed at the vehicle speed when the operation is released. The first target speed update processing has no particularly limited situation for application, however, may be typically applied to driving of the vehicle on a long road with a down slope (see FIGS. 4A and 4B), or a flat road without a curve (see FIGS. 4C and 4D).

Next, the operation of a vehicle (equipped with a cruise control apparatus) according to the comparative example when the vehicle runs on a long road with a down slope will be described. Now, assume that the vehicle according to the comparative example drives on a long road with a down slope as illustrated in FIG. 3A while performing cruise control by the cruise control apparatus. In this case, even when a brake operation and an accelerator operation are not performed, the speed of the vehicle is maintained so as to follow the target speed in a time interval of t1 to t2 as illustrated in FIG. 3B.

Now, assume that a driver continues to perform a brake operation in a time interval of t2 to t3 in order to reduce the current speed of the vehicle. Accordingly, the vehicle speed is gradually reduced in the time interval of t2 to t3. Then, the cruise control apparatus mounted in the vehicle according to the comparative example determines that cruise control is not necessary, and thus the cruise control after time t2 is canceled. Subsequently, when a driver releases a brake operation at time t3, the vehicle speed gradually increases in a time interval after t3. This is because the cruise control after time t2 has been canceled. Thus, in the vehicle according to the comparative example, a driver needs to often adjust the vehicle speed, and thus appropriate driving of the vehicle may not be achieved depending on the attribute of a driver of whether the driver is a novice or an experienced driver, or driving characteristics of whether a driver is courageous or cautious.

Thus, when a brake operation for deceleration but not for hard braking (deceleration for maintaining the vehicle speed on a road with a down slope is included) is maintained for more than a predetermined time interval to achieve a stable speed, and the brake operation is released during stable driving, the cruise control apparatus 11 according to the first embodiment of the present disclosure updates the target speed to the vehicle speed when the brake operation is released by assuming that the driver has an intention to maintain the cruising speed at the vehicle speed when the brake operation is released.

Next, the operation of the vehicle equipped with the cruise control apparatus 11 according to the first embodiment will be described. Now, assume that the vehicle equipped with the cruise control apparatus 11 according to the first embodiment is running on a long road with a down slope (similar to the road in the comparative example) as illustrated in FIG. 4A. In this case, even when a brake operation and an accelerator operation are not performed, the vehicle speed is maintained so as to follow the target speed (previous current target speed) in a time interval of t11 to t12 as illustrated in FIG. 4B.

Now, assume that a driver continues to perform a brake operation in a time interval of t12 to t13 in order to reduce the current speed of the vehicle. Accordingly, the vehicle speed is gradually reduced in the time interval of t12 to t13. Subsequently, when the driver continues to perform a softer brake operation in a time interval of t13 to t14 in order to reduce the current speed of the vehicle, the current speed of the vehicles is maintained so as to follow the (new) target speed in the time interval of t13 to t14 (see "INTERVAL FOR CONSTANT SPEED DRIVE DETERMINATION" illustrated in FIG. 4B).

Assume that subsequently, the driver releases the brake operation at time t14. Then, in the cruise control apparatus 11 according to the first embodiment, the target speed setting unit 67 updates the target speed (new target speed after the update) to the vehicle speed when the brake operation is released at time t14. Consequently, the speed of the vehicle is maintained so as to follow the (new) target speed in a time interval after t14 (see "INTERVAL OF CRUISE CONTROL ACCORDING TO FIRST EMBODIMENT" illustrated in FIG. 4B). In the time interval after t14, the brake pressure is adjusted to the same level as in the time interval of t13 to t14 by the cruise control function achieved by the cruise control unit 69.

Figure 4C:
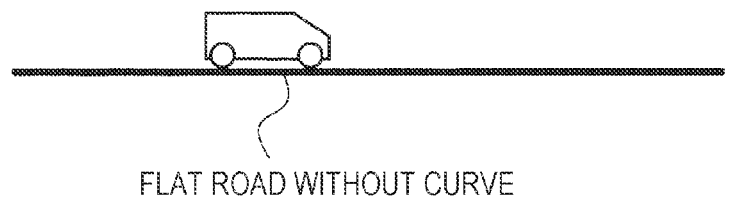
FIG. 4C illustrates a situation in which a vehicle equipped with the cruise control apparatus according to the first embodiment drives on a flat road without a curve.
Figure 4D:
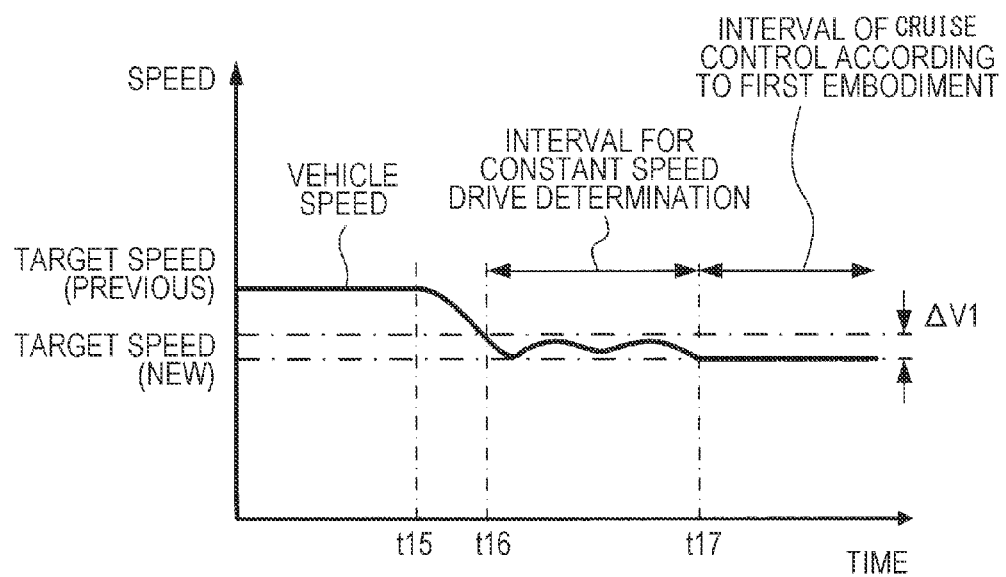
FIG. 4D is a graph for illustrating the operation of the cruise control apparatus according to the first embodiment and mounted in the vehicle illustrated in FIG. 4C.

Next, the operational effect of the cruise control apparatus 11 according to the first embodiment of the present disclosure when a vehicle is running on a flat road without a curve will be described with reference to FIGS. 4C and 4D. FIG. 4C illustrates a situation in which a vehicle equipped with the cruise control apparatus 11 according to the first embodiment drives on a flat road without a curve. FIG. 4D is a graph for illustrating the operation of the cruise control apparatus 11 according to the first embodiment and mounted in the vehicle illustrated in FIG. 4C.

Now, assume that a vehicle equipped with the cruise control apparatus 11 according to the first embodiment is running on a flat road without a curve as illustrated in FIG. 4C. In this case, even when a brake operation and an accelerator operation are not performed, the vehicle speed is maintained so as to follow the target speed (previous current target speed) in a time interval before t15 as illustrated in FIG. 4D.

Now, assume that a driver performs a brake operation by pumping in a time interval of t15 to t17 in order to reduce the current speed of the vehicle. Accordingly, the vehicle speed is gradually reduced in the time interval of t15 to t16. Assume that subsequently the speed of the vehicle is maintained within a predetermined speed range $\Delta V1$ by a brake operation or an accelerator operation of the driver in the time interval of t16 to t17 (see "INTERVAL FOR CONSTANT SPEED DRIVE DETERMINATION" illustrated in FIG. 4D).

Assume that this state of the speed maintained within $\Delta V1$ exceeds a predetermined time for determining constant speed driving at time t17 (a predetermined threshold time length for determining whether or not the vehicle maintains constant speed driving). Then, in the cruise control apparatus 11 according to the first embodiment, the target speed setting unit 67 updates the target speed, for example, to the current vehicle speed at time t17 (new target speed after the update). However, several modifications other than the embodiment in which the target speed is updated to the current speed at time t17 may be adopted for determining the target speed. The modifications will be described in detail below.

Consequently, the speed of the vehicle is maintained so as to follow the (new) target speed in a time interval after t17 (see "INTERVAL OF CRUISE CONTROL ACCORDING TO FIRST EMBODIMENT" illustrated in FIG. 4D). In the time interval after t17, in order for the current vehicle speed to follow the (new) target speed, for example, opening adjustment of the throttle valve is made by cruise control function achieved by the cruise control unit 69.

The above-described operation may correspond to "the target speed is updated to the current speed (new target speed) when the absolute value of the difference between the current speed (new target speed) and the (previous) target speed exceeds a predetermined value, and the change in the vehicle speed is maintained in a predetermined range (predetermined speed range $\Delta V1$) for more than a predetermined time interval (time interval of t16 to t17)" in the present disclosure.

In short, the cruise control apparatus 11 according to the first embodiment of the present disclosure updates the target speed to the current speed when a driver has an intention to maintain the speed at a speed different from the target speed, and the absolute value of the difference between the current speed and the target speed exceeds a predetermined value, and the speed change is maintained in a predetermined range for more than a predetermined time interval, and therefore, appropriate cruise control function can be achieved according to the driving intention of the driver irrespective of the attribute of the driver of whether the driver is a novice or an experienced driver, or driving characteristics of whether the driver is courageous or cautious.

For example, updating operation of the target speed using the change in the current speed may be embodied as follows. Upon release of the braking operation, the target speed setting unit 67 saves the current vehicle speed Vt to a memory device. Then, the target speed setting unit 67 analyzes the change in the vehicle speed during a predetermined time frame prior to t17 (e.g., 3 seconds). This predetermined past time frame corresponds to the time frame t16 to t17 in FIG. 4D. Then, the target speed setting unit 67 determines if the change in the vehicle speed during the predetermined time frame is maintained within a predetermined range ΔV1. If this determination is positive, the first requirement for updating the target speed will be satisfied. Here, the predetermined range ΔV1 may be set by, for example, setting the vehicle speed Vt as a reference speed, then adding a certain positive value or negative value, or both to this reference speed. For example, this predetermined range ΔV1 may be "Vt±3 km/h."

The second requirement for updating the target speed is that the absolute difference value ΔV between the vehicle speed and the target speed goes beyond a predetermined threshold T1. The determination for the second requirement may be performed after detecting the event of releasing the braking operation. In such a configuration, the target speed setting unit 67 may perform this determination by analyzing the change in the vehicle speed during a predetermined time frame prior to the releasing. Alternatively, the target speed setting unit 67 may regularly perform the determination and save positive determination (if any) to a memory device for a certain period of time. In this configuration, the target speed setting unit 67 may perform the update of the target speed to the vehicle speed Vt when the first requirement is satisfied during the period of time in which the positive determination is held in the memory.

More specifically, in FIG. 4D, the vehicle speed decreases during the time frame t15 to t16. The target speed setting unit 67 regularly monitors if the absolute difference value ΔV between the vehicle speed and the target speed goes beyond a predetermined threshold T1. Such a monitoring may be performed by regularly calling for a routine or subroutine comprising a step of calculating the absolute difference value ΔV between the vehicle speed and the target speed and a step of determining if the absolute difference value ΔV goes beyond the T1.

The cruise control apparatus 11 according to the first embodiment of the present disclosure may adopt a configuration in which the target speed is updated when the brake operation amount is maintained in a predetermined range exceeding a predetermined value for more than a predetermined time interval. With this configuration, even when a driver performs a decelerating operation momentarily by mistake, an erroneous update of target speed based on such a misoperation is not performed, thereby providing excellent operability (fool proof).

Figure 5A:
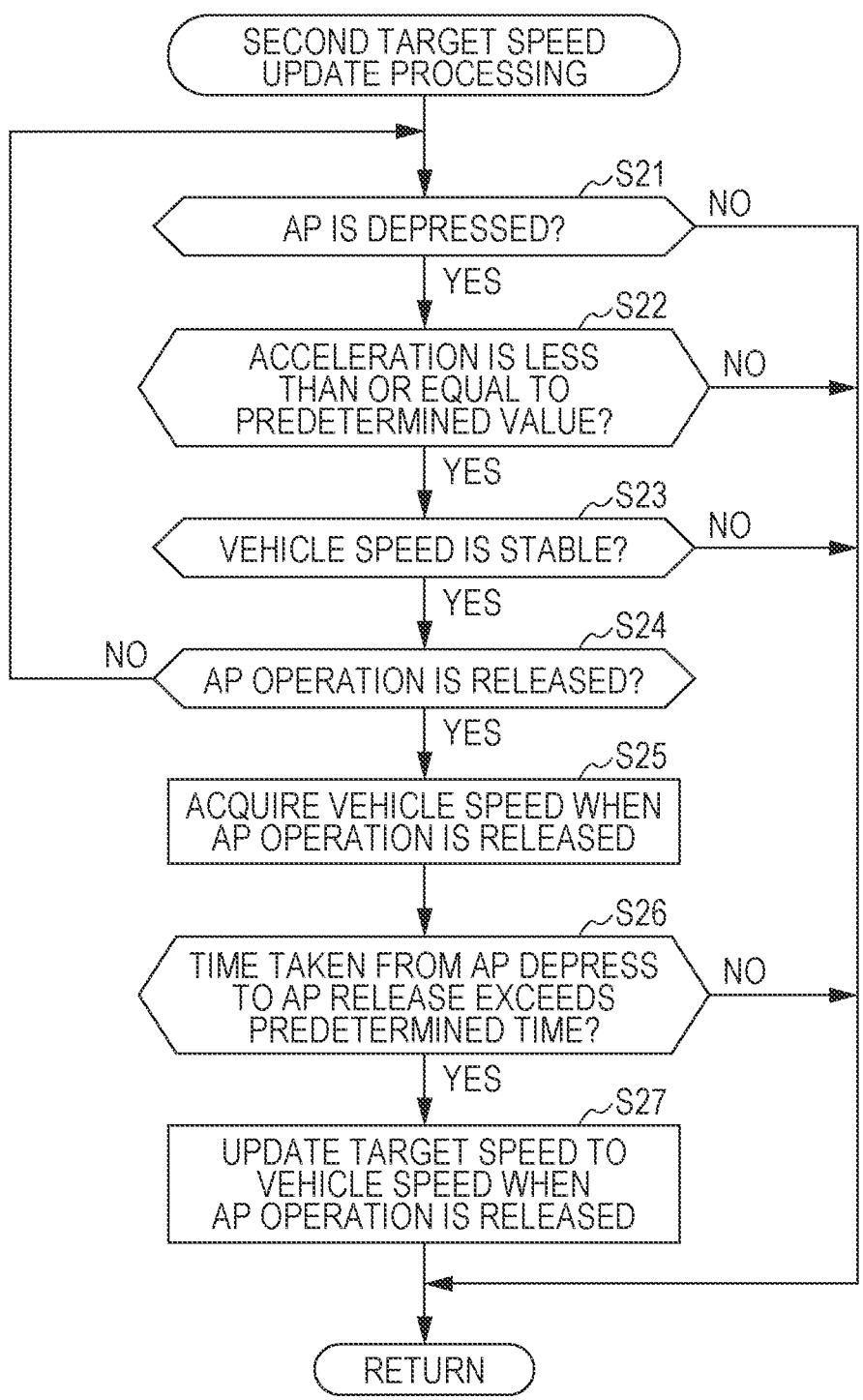
FIG. 5A is a flowchart illustrating second target speed update processing performed by a target speed setting unit of a cruise control apparatus according to a second embodiment.

Operation of Cruise Control System 11 According to Second Embodiment of Present Disclosure Next, the operation of a cruise control apparatus 11 according to a second embodiment of the present disclosure will be described with reference to FIG. 5A. FIG. 5A is a flowchart illustrating second target speed update processing performed by a target speed setting unit 67 of the cruise control apparatus 11 according to the second embodiment. In step S21 illustrated in FIG. 5A, the cruise control unit 69 determines whether or not the accelerator pedal Ap has been depressed based on the accelerator operation amount acquired by the accelerator pedal sensor 51.

When it is determined that the accelerator pedal Ap has not been depressed as a result of the determination in step S21 ("No" in step S21), the cruise control unit 69 repeats the process in step S21 until it is determined that the accelerator pedal Ap is depressed.

On the other hand, when it is determined that the accelerator pedal Ap has been depressed as a result of the determination in step S21 ("Yes" in step S21), the cruise control unit 69 proceeds the process to step S22. When it is determined in step S21 that the accelerator pedal Ap has been depressed, the cruise control unit 69 stops the cruise control according to the above-described principle.

In step S22, the cruise control unit 69 determines whether or not the acceleration is less than or equal to a predetermined value, the acceleration being obtained by differentiating in time a vehicle speed detected by the vehicle speed sensor 41. The purpose why the above determination is made in step S22 is to determine whether the depressing of accelerator pedal Ap in step S21 is substantially comparable to hard acceleration. It is to be noted that the determination in step S22 may be omitted. When the determination in step S22 is omitted and it is determined that the accelerator pedal Ap has been depressed as a result of the determination in step S21 ("Yes" in step S21), the cruise control unit 69 proceeds the process to step S23.

When it is determined that the acceleration is greater than a predetermined value as a result of the determination in step S22 ("No" in step S22), the cruise control unit 69 returns the process to step S21, and repeats the subsequent process.

On the other hand, when it is determined that the acceleration is not greater than a predetermined value as a result of the determination in step S22 ("No" in step S22), the cruise control unit 69 proceeds the process to step S23.

In step S23, the cruise control unit 69 determines whether or not the speed of the vehicle is stable. The determination is made, for example, by checking whether an error between the current speed and a reference speed is within an acceptable value (for example, 5 km/h which can be changed as needed), the reference speed being the vehicle speed when the accelerator pedal Ap is depressed ("Yes" in step S21). Specifically, in the case where the vehicle speed when the accelerator pedal Ap is depressed is 35 km/h, and the acceptable value of error with respect to a reference speed is set to 5 km/h, the vehicle speed is considered to be stable when in a speed range of 30 to 40 km/h (corresponding to a speed range with a predetermined width).

When it is determined that the vehicle speed is not stable as a result of the determination in step S23 ("No" in step S23), the cruise control unit 69 returns the process to step S21, and repeats the subsequent process.

On the other hand, when it is determined that the vehicle speed is stable as a result of the determination in step S23 ("Yes" in step S23), the cruise control unit 69 proceeds the process to step S24.

In step S24, the cruise control unit 69 determines whether or not depressing operation of the accelerator pedal Ap has been released (including a state in which the accelerator operation amount is less than or equal to a predetermined value) based on the accelerator operation amount which is acquired by the accelerator pedal sensor 51.

When it is determined that depressing operation of the accelerator pedal Ap has not been released as a result of the determination in step S24 ("No" in step S24), the cruise control unit 69 returns the process to step S21, and repeats the subsequent process.

On the other hand, when it is determined that depressing operation of the accelerator pedal Ap has been released as a result of the determination in step S24 ("Yes" in step S24), the cruise control unit 69 proceeds the process to step S25. When it is determined in step S24 that depressing operation of the accelerator pedal Ap has been released, the cruise control unit 69 resumes the cruise control according to the above-described principle. In the subsequent step S25 to S27, it is determined whether the last speed or an updated speed is used as the target speed for restarted cruise control.

In step S25, the cruise control unit 69 acquires from the vehicle speed sensor 41 the vehicle speed when depressing operation of the accelerator pedal Ap is released.

In step S26, the cruise control unit 69 determines whether the time interval from the depressing of the accelerator pedal Ap (step S21) to the release of the depressing operation is greater than a predetermined time (for example, 3 seconds which can be changed as needed). It is to be noted that the determination in step S26 may be omitted. When the determination in step S26 is omitted, after the processing of step S25, the cruise control unit 69 proceeds the process to step S27.

When it is determined that the time interval from the depressing of the accelerator pedal Ap to the release of the depressing operation is not greater than a predetermined time as a result of the determination in step S26 ("No" in step S26), the cruise control unit 69 returns the process to step S21, and repeats the subsequent process.

On the other hand, when it is determined that the time interval from the depressing of the accelerator pedal Ap to the release of the depressing operation is greater than a predetermined time as a result of the determination in step S26 ("Yes" in step S26), the cruise control unit 69 proceeds the process to step S27.

In step S27, the cruise control unit 69 sends a command to the target speed setting unit 67 to update the target speed to the vehicle speed when the depressing operation of the accelerator pedal Ap is released, the vehicle speed being acquired in step S25. Upon receiving the command, the target speed setting unit 67 updates the target speed to the vehicle speed when the depressing operation of the accelerator pedal Ap is released, the vehicle speed being acquired in step S25. After the update, the cruise control unit 69 returns the process to step S21, and repeats the subsequent process.

Figure 5B:
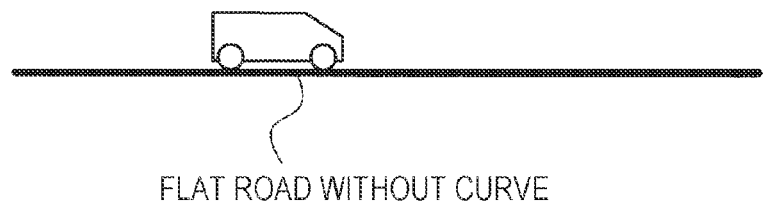
FIG. 5B illustrates a situation in which a vehicle equipped with the cruise control apparatus according to the second embodiment drives on a flat road without a curve.
Figure 5C:
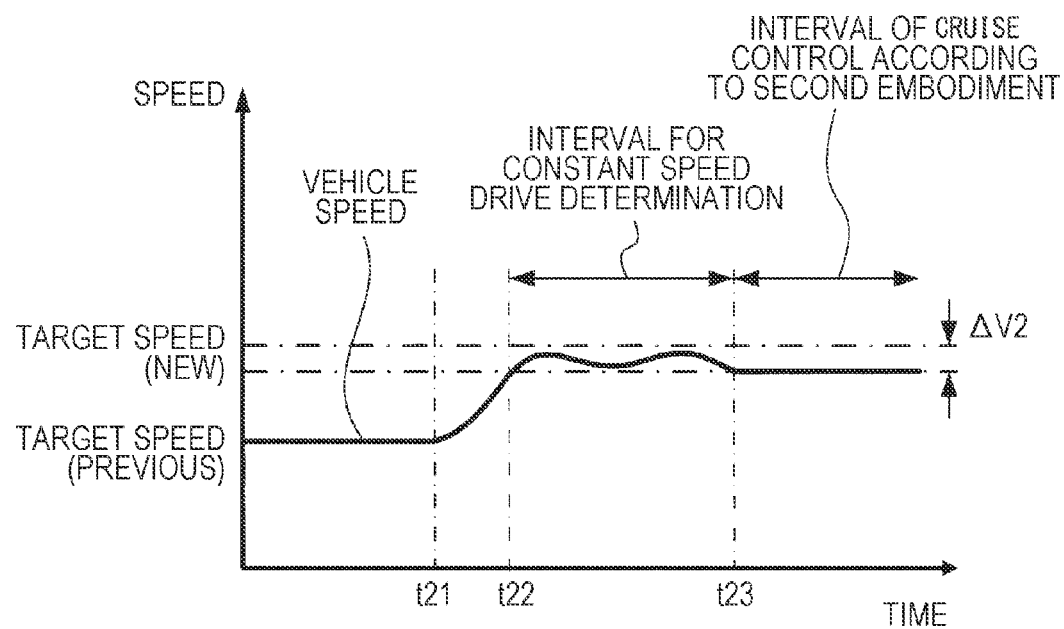
FIG. 5C is a graph for illustrating the operation of the cruise control apparatus according to the second embodiment and mounted in the vehicle illustrated in FIG. 5B.

Detailed Operation of Cruise Control System 11 According to Second Embodiment of Present Disclosure Next, more detailed operation of the cruise control apparatus 11 according to the second embodiment of the present disclosure when a vehicle is running on a flat road without a curve will be described with reference to FIGS. 5B and 5C. FIG. 5B illustrates a situation in which a vehicle equipped with the cruise control apparatus 11 according to the second embodiment drives on a flat road without a curve. FIG. 5C is a graph for illustrating the operation of the cruise control apparatus 11 according to the second embodiment and mounted in the vehicle illustrated in FIG. 5B.

The cruise control apparatus 11 according to the second embodiment of the present disclosure has a configuration in which when the accelerator operation amount acquired by the accelerator pedal sensor 51 (acceleration and deceleration operation amount acquisition unit) is maintained in a predetermined range exceeding a predetermined value for more than a predetermined time interval, the target speed setting unit 67 updates the target speed to the vehicle speed when the accelerator operation is released. The second target speed update processing has no particularly limited situation for application, however, may be typically applied to driving of the vehicle on an ascending road, or a flat road without a curve (see FIGS. 5B and 5C).

Now, assume that a vehicle equipped with the cruise control apparatus 11 according to the second embodiment is running on a flat road without a curve as illustrated in FIG. 5B. In this case, even when a brake operation and an accelerator operation are not performed, the vehicle speed is maintained so as to follow the target speed (previous current target speed) in a time interval before t21 as illustrated in FIG. 5C.

Now, assume that a driver performs an acceleration operation in a time interval of t21 to t23 in order to increase the current speed of the vehicle. Accordingly, the vehicle speed is gradually increased in the time interval of t21 to t22. Assume that subsequently the speed of the vehicle is maintained within a predetermined speed range $\Delta V2$ by an accelerator operation or a brake operation of the driver in the time interval of t22 to t23 (see "INTERVAL FOR CONSTANT SPEED DRIVE DETERMINATION" illustrated in FIG. 5C).

Assume that the state of the speed maintained within the range $\Delta V2$ exceeds a predetermined time for determining constant speed driving at time t23 (a predetermined threshold time length for determining whether or not the vehicle maintains constant speed driving). Then, in the cruise control apparatus 11 according to the second embodiment, the target speed setting unit 67 updates the target speed, for example, to the current vehicle speed at time t23 (new target speed after the update). However, several modifications other than the embodiment in which the target speed is updated to the current speed at time t23 may be adopted for determining the target speed. The modifications will be described in detail below.

Consequently, the speed of the vehicle is maintained so as to follow the (new) target speed in a time interval after t23 (see "INTERVAL OF CRUISE CONTROL ACCORDING TO SECOND EMBODIMENT" illustrated in FIG. 5C). In the time interval after t23, in order for the current vehicle speed to follow the (new) target speed, for example, opening adjustment of the throttle valve is made by the cruise control function achieved by the cruise control unit 69.

The above-described operation may correspond to "the target speed is updated to the current speed (new target speed) when the absolute value of the difference between the current speed (new target speed) and the (previous) target speed exceeds a predetermined value, and the change in the vehicle speed is maintained in a predetermined range (predetermined speed range $\Delta V2$) for more than a predetermined time interval (time interval of t22 to t23)" in the present disclosure.

In short, the cruise control apparatus 11 according to the second embodiment of the present disclosure updates the target speed to the current speed when a driver has an intention to maintain at a speed different from the target speed, and the absolute value of the difference between the current speed and the target speed exceeds a predetermined value, and the speed change is maintained in a predetermined range for more than a predetermined time interval, and therefore, appropriate cruise control function can be achieved according to the driving intention of the driver irrespective of the attribute of the driver of whether the driver is a novice or an experienced driver, or driving characteristics of whether the driver is courageous or cautious.

Now, when an accelerator operation, which is for slow acceleration and not for hard acceleration (including maintenance of the speed on an ascending road), is maintained for more than a predetermined time interval to achieve a stable speed, and the accelerator operation is released during stable driving, the cruise control apparatus 11 according to the second embodiment of the present disclosure updates the target speed to the vehicle speed when the accelerator operation is released by assuming that the driver has an intention to maintain the cruising speed at the vehicle speed when the accelerator operation is released.

The cruise control apparatus 11 according to the second embodiment of the present disclosure achieves appropriate cruise control function which reflects the intention of a driver irrespective of the attribute of the driver of whether the driver is a novice or an experienced driver, or driving characteristics of whether the driver is courageous or cautious.

The cruise control apparatus 11 according to the second embodiment of the present disclosure may adopt a configuration in which the target speed is updated when the accelerator operation amount is maintained in a predetermined range exceeding a predetermined value for more than a predetermined time interval. With this configuration, even when a driver performs an accelerating operation momentarily by mistake, an erroneous update of target speed based on such a misoperation is not performed, thereby providing excellent operability (fool proof).

Figure 6:
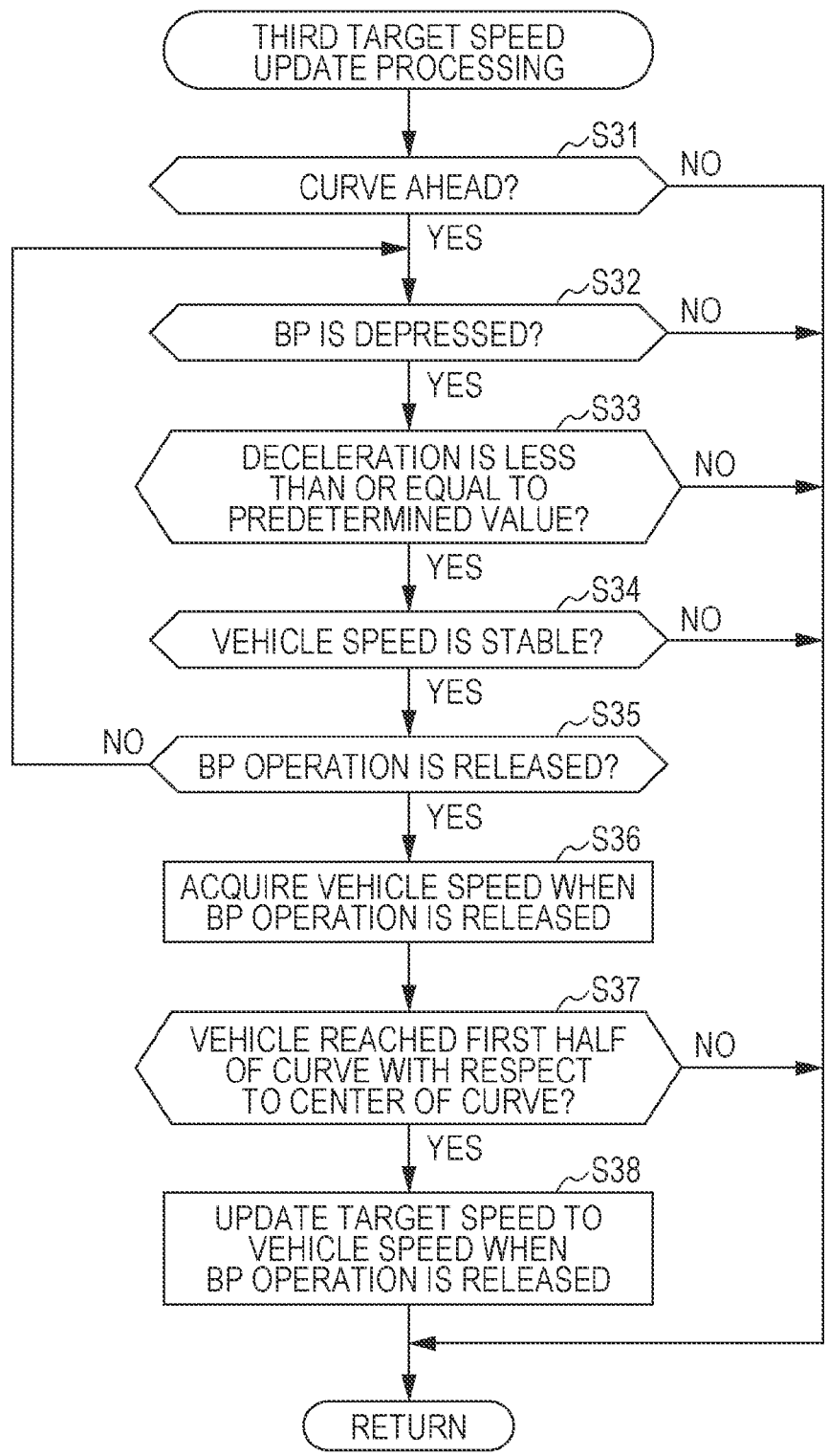
FIG. 6 is a flowchart illustrating third target speed update processing performed by a target speed setting unit of a cruise control apparatus according to a third embodiment.

Operation of Cruise Control System 11 According to Third Embodiment of Present Disclosure Next, the operation of a cruise control apparatus 11 according to a third embodiment of the present disclosure will be described with reference to FIG. 6. FIG. 6 is a flowchart illustrating third target speed update processing performed by a target speed setting unit 67 of the cruise control apparatus 11 according to the third embodiment.

In step S31 illustrated in FIG. 6, the cruise control unit 69 determines whether or not a curve or a curved road is ahead in the driving direction based on information of road ahead in the driving direction of the vehicle, the information being acquired by a navigation processing unit 21.

When it is determined that no curve is ahead in the driving direction as a result of the determination in step S31 ("No" in step S31), the cruise control unit 69 repeats the process in step S31 until it is determined that a curve is ahead in the driving direction.

On the other hand, when it is determined that a curve is ahead in the driving direction as a result of the determination in step S31 ("Yes" in step S31), the cruise control unit 69 proceeds the process to step S32.

In step S32, the cruise control unit 69 determines whether or not the brake pedal has been depressed based on the brake operation amount which is acquired by the brake pedal sensor 53.

When it is determined that the brake pedal has not been depressed as a result of the determination in step S32 ("No" in step S32), the cruise control unit 69 returns the process to step S31, and repeats the subsequent process.

On the other hand, when it is determined that the brake pedal has been depressed as a result of the determination in step S32 ("Yes" in step S32), the cruise control unit 69 proceeds the process to step S33. When it is determined in step S32 that the brake pedal has been depressed, the cruise control unit 69 stops the cruise control according to the above-described principle.

In step S33, the cruise control unit 69 determines whether or not a deceleration is less than or equal to a predetermined value, the deceleration being obtained by differentiating in time a vehicle speed detected by the vehicle speed sensor 41. The purpose why the above determination is made in step S33 is to determine whether the depressing of the brake pedal in step S32 is substantially comparable to hard braking. It is to be noted that the determination in step S33 may be omitted. In this case, the process in step S34 is performed immediately after "Yes" in step S32.

When it is determined that the deceleration is greater than a predetermined value as a result of the determination in step S33 ("No" in step S33), the cruise control unit 69 returns the process to step S31, and repeats the subsequent process.

When it is determined that the deceleration is not greater than a predetermined value as a result of the determination in step S33 ("Yes" in step S33), the cruise control unit 69 proceeds the process to step S34.

In step S34, the cruise control unit 69 determines whether or not the speed of the vehicle is stable. The determination is made, for example, by checking whether an error between the current speed and a reference speed is within an acceptable value (for example, 5 km/h which can be changed as needed), the reference speed being the vehicle speed when the brake pedal is depressed ("Yes" in step S32). Specifically, in the case where the vehicle speed when the brake pedal is depressed is 35 km/h, and the acceptable value of error with respect to a reference speed is set to 5 km/h, the vehicle speed is considered to be stable when in a speed range of 30 to 40 km/h (corresponding to a speed range with a predetermined width). It is to be noted that the determination in step S34 may be omitted. In this case, the process in step S35 is performed immediately after "Yes" in step S33.

When it is determined that the vehicle speed is not stable as a result of the determination in step S34 ("No" in step S34), the cruise control unit 69 returns the process to step S31, and repeats the subsequent process.

On the other hand, when it is determined that the vehicle speed is stable as a result of the determination in step S33 ("Yes" in step S34), the cruise control unit 69 proceeds the process to step S35.

In step S35, the cruise control unit 69 determines whether or not depressing operation of the brake pedal has been released based on the brake operation amount which is acquired by the brake pedal sensor 53.

When it is determined that depressing operation of the brake pedal has not been released as a result of the determination in step S35 ("No" in step S35), the cruise control unit 69 returns the process to step S31, and repeats the subsequent process.

On the other hand, when it is determined that depressing operation of the brake pedal has been released as a result of the determination in step S35 ("Yes" in step S35), the cruise control unit 69 proceeds the process to step S36. When it is determined in step S35 that depressing operation of the brake pedal has been released, the cruise control unit 69 resumes the cruise control according to the above-described principle. In the subsequent step S36 to S38, it is determined whether the last speed or an updated speed is used as the target speed for restarted cruise control.

In step S36, the cruise control unit 69 acquires from the vehicle speed sensor 41 the vehicle speed when depressing operation of the brake pedal is released.

In step S37, the cruise control unit 69 determines whether or not the vehicle has reached the first half of a curve ahead in the driving direction with respect to the center of the curve. It is to be noted that the determination in step S37 may be omitted. In this case, the process in step S37 is performed immediately after the process in step S36. This step may determine whether or not the vehicle has reached and is still in the first half of a curve ahead in the driving direction with respect to the center of the curve.

When it is determined that the vehicle has passed the first half of a curve ahead in the driving direction with respect to the center of the curve and has reached the second half of the curve as a result of the determination in step S37 ("No" in step S37), the cruise control unit 69 returns the process to step S31, and repeats the subsequent process.

On the other hand, when it is determined that the vehicle has reached the first half of a curve ahead in the driving direction with respect to the center of the curve as a result of the determination in step S37, the cruise control unit 69 proceeds the process to step S38.

In step S38, the cruise control unit 69 sends a command to the target speed setting unit 67 to update the target speed to the vehicle speed when the depressing operation of the brake pedal is released, the vehicle speed being acquired in step S36. Upon receiving the command, the target speed setting unit 67 updates the target speed to the vehicle speed when the depressing operation of the brake pedal is released, the vehicle speed being acquired in step S36. After the update, the cruise control unit 69 returns the process to step S31, and repeats the subsequent process.

Figure 7A:
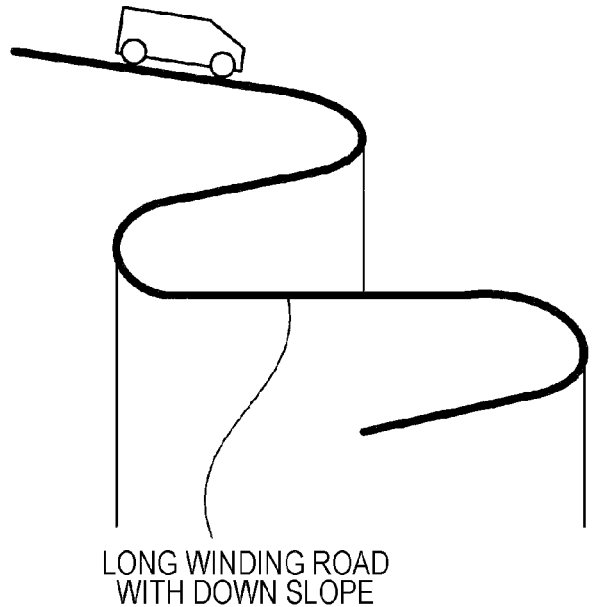
FIG. 7A illustrates a situation in which a vehicle according to the comparative example drives on a long winding road with a down slope.
Figure 7B:
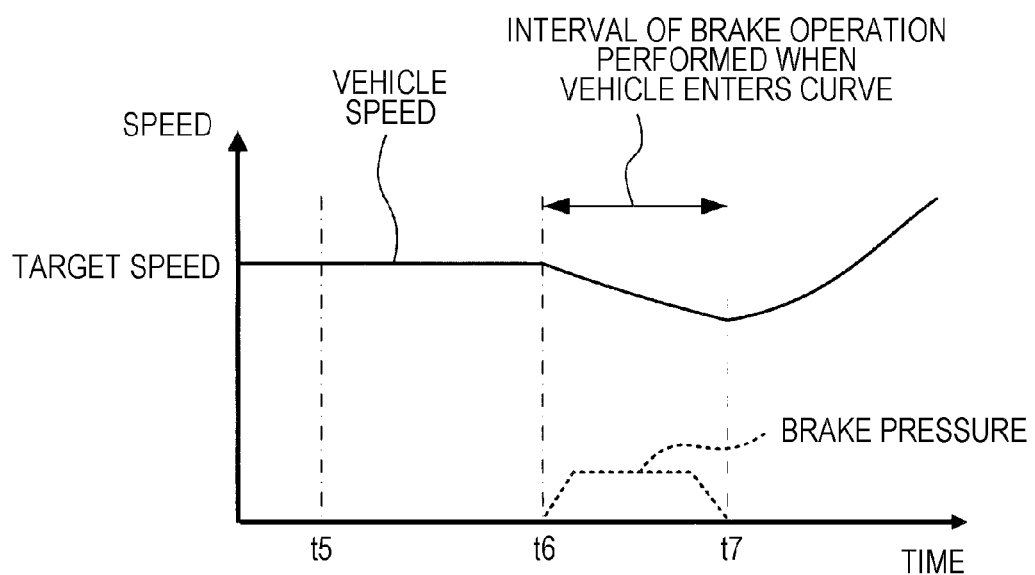
FIG. 7B is a graph for illustrating the operation of the cruise control apparatus mounted in the vehicle according to the comparative example.
Figure 8A:
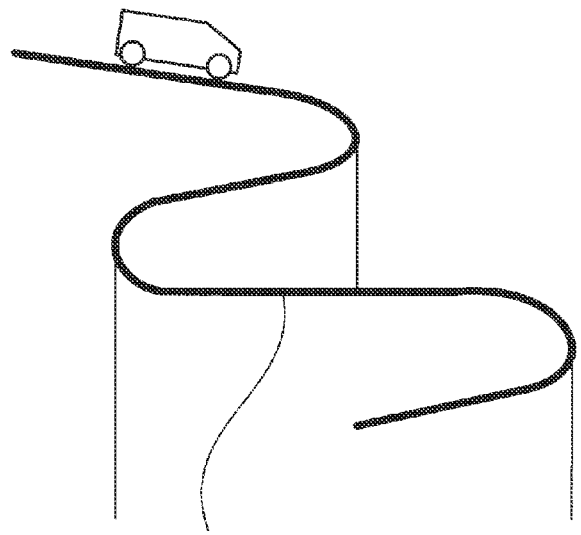
FIG. 8A illustrates a situation in which a vehicle equipped with the cruise control apparatus according to the third embodiment drives on a long winding road with a down slope.
Figure 8B:
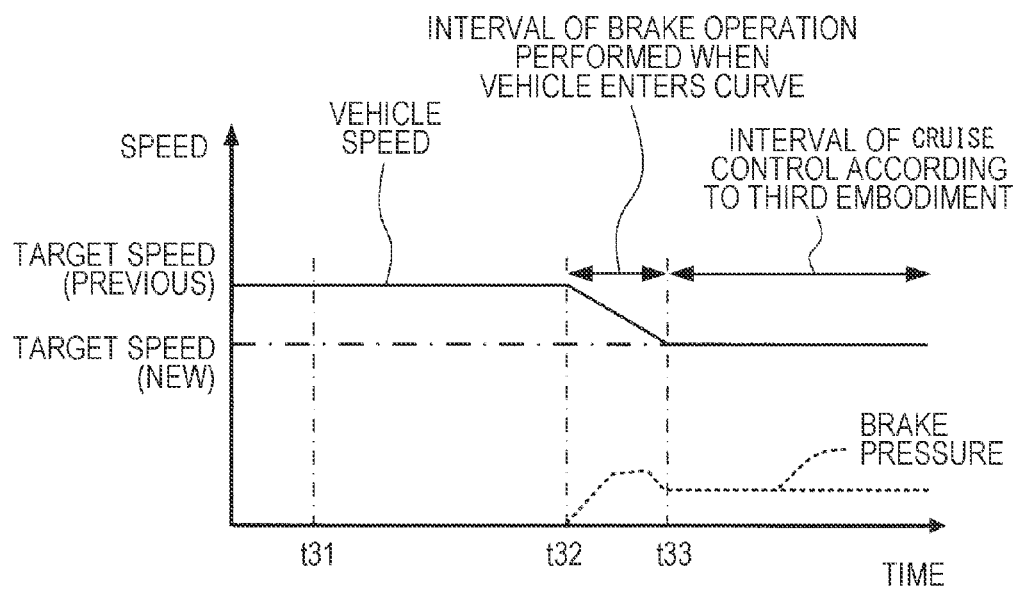
FIG. 8B is a graph for illustrating the operation of the cruise control apparatus according to the third embodiment and mounted in the vehicle illustrated in FIG. 8A.

Detailed Operation of Cruise Control System 11 According to Third Embodiment of Present Disclosure Next, more detailed operation of the cruise control apparatus 11 according to the third embodiment of the present disclosure will be described with reference to FIGS. 7A, 7B, 8A, and 8B. FIG. 7A illustrates a situation in which a vehicle according to the comparative example drives on a long winding road with a down slope. FIG. 7B is a graph for illustrating the operation of the cruise control apparatus mounted in the vehicle according to the comparative example. FIG. 8A illustrates a situation in which a vehicle equipped with the cruise control apparatus according to the third embodiment drives on a long winding road with a down slope. FIG. 8B is a graph for illustrating the operation of the cruise control apparatus according to the third embodiment and mounted in the vehicle illustrated in FIG. 8A.

The cruise control apparatus 11 according to the third embodiment of the present disclosure has a configuration in which when the navigation processing unit (curve detection unit) 21 detects that the vehicle has entered a curve, and the brake operation amount acquired by the brake pedal sensor 53 (acceleration and deceleration operation amount acquisition unit) is maintained in a predetermined range exceeding a predetermined value, and the brake operation is released, the target speed setting unit 67 updates the target speed to the vehicle speed when the brake operation is released. The third target speed update processing has no particularly limited situation for application, however, may be typically applied to driving of the vehicle on a long winding road with a down slope.

Next, the operation of a vehicle (equipped with a cruise control apparatus) according to the comparative example when the vehicle runs on a long winding road with a down slope will be described. Now, assume that the vehicle according to the comparative example drives on a long winding road with a down slope as illustrated in FIG. 7A while performing cruise control by the cruise control apparatus. In this case, even when a brake operation and an accelerator operation are not performed, the speed of the vehicle is maintained so as to follow the target speed in a time interval of t5 to t6 as illustrated in FIG. 7B.

Now, assume that a driver continues to perform a brake operation in a time interval of t6 to t7 in order to reduce the current speed of the vehicle. Accordingly, the vehicle speed is gradually reduced in the time interval of t6 to t7. Then, the cruise control apparatus mounted in the vehicle according to the comparative example determines that cruise control is not necessary, and thus the cruise control after time t6 is canceled. Subsequently, when a driver releases a brake operation at time t7, the vehicle speed gradually increases in a time interval after t7. This is because the cruise control after time t6 has been canceled. Thus, in the vehicle according to the comparative example, a driver needs to often adjust the vehicle speed, and thus appropriate driving of the vehicle may not be achieved depending on the attribute of a driver of whether the driver is a novice or an experienced driver, or driving characteristics of whether a driver is courageous or cautious.

Thus, when the vehicle has entered a curve, and a brake operation for deceleration but not for hard braking (deceleration for maintaining the vehicle speed on a road with a down slope is included) is performed and then released, the cruise control apparatus 11 according to the third embodiment of the present disclosure updates the target speed to the vehicle speed when the brake operation is released by assuming that the driver has an intention to maintain the cruising speed at the vehicle speed when the brake operation is released. It is to be noted that a driving time along a curve is generally shorter than a driving time on a straight road. Then, when the vehicle is running along a curve, the target speed is updated to the vehicle speed when an acceleration/deceleration operation is released even when either the vehicle speed or the acceleration/deceleration operation amount is not maintained for more than a predetermined time interval.

Next, the operation of a vehicle running on a long winding road with a down slope will be described, the vehicle being equipped with the cruise control apparatus 11 according to the third embodiment. Now, assume that the vehicle equipped with the cruise control apparatus 11 according to the third embodiment is running on a long winding road with a down slope (similar to the road in the comparative example) as illustrated in FIG. 8A. In this case, even when a brake operation and an accelerator operation are not performed, the vehicle speed is maintained so as to follow the target speed (previous current target speed) in a time interval of t31 to t32 as illustrated in FIG. 8B.

Now, assume that a driver continues to perform a brake operation in a time interval of t32 to t33 in order to reduce the current speed of the vehicle. Accordingly, the vehicle speed is gradually reduced in the time interval of t32 to t33. Assume that subsequently the driver releases the brake operation at time t33. The target speed setting unit 67 of the cruise control apparatus 11 according to the third embodiment then updates the target speed to the vehicle speed at time t33 when the brake operation is released. Consequently, the speed of the vehicle is maintained so as to follow the (new) target speed in a time interval after t33 (see "INTERVAL OF CRUISE CONTROL ACCORDING TO THIRD EMBODIMENT" illustrated in FIG. 8B). In the time interval after t33, the brake pressure is adjusted by the cruise control function achieved by the cruise control unit 69.

The cruise control apparatus 11 according to the third embodiment of the present disclosure achieves appropriate cruise control function which reflects the intention of a driver while driving the vehicle along a curve irrespective of the attribute of the driver of whether the driver is a novice or an experienced driver, or driving characteristics of whether the driver is courageous or cautious.

Particularly, when the vehicle has entered a curve, a brake operation for deceleration but not for hard braking (deceleration for maintaining the vehicle speed on a road with a down slope is included) is performed, then released, and the vehicle has reached the first half of a curve ahead in the driving direction with respect to the center of the curve, the target speed setting unit 67 of the cruise control apparatus 11 according to the third embodiment of the present disclosure updates the target speed to the vehicle speed when the brake operation is released by assuming that the driver has an intention to maintain the cruising speed at the vehicle speed when the brake operation is released.

Before a vehicle enters a curve, the cruise control apparatus 11 according to the third embodiment of the present disclosure performs cruise control based on the depth, length of the curve so that a vehicle can run along a curve safely. However, when the vehicle actually enters a curve, a difference may occur between the target speed according to the cruise control and the preferred target speed according to the intention of a driver.

When the vehicle has reached the first half of a curve ahead in the driving direction with respect to the center of the curve, the cruise control apparatus 11 according to the third embodiment of the present disclosure updates the target speed to the vehicle speed when a brake operation is released. Thus, cruise control is performed so as to follow the updated target speed in the first half of the curve with respect to the center of the curve. In contrast to cruise control which is performed so as to follow the updated target speed in the second half of the curve with respect to the center of the curve, the cruise control apparatus 11 according to the third embodiment achieves early, stable cruise control in the first half of the curve with respect to the center of the curve in order to pass through the curve.

Other Embodiments or Modifications

The embodiments described above illustrate implemented examples of the present disclosure. Therefore, those embodiments are not to be construed to limit the scope of the present invention. This is because the present disclosure may be practiced in various embodiments without departing from the gist and the main characteristics.

For example, the first to third embodiments of the present disclosure may adopt a configuration in which the cruise control unit 69 performs deceleration control using engine braking or regenerative braking when the current vehicle speed detected by the vehicle speed sensor (current speed detection unit) 41 is higher than the target speed updated by the target speed setting unit 67, and performs brake control using a hydraulic brake device when the current vehicle speed after continuous brake control for a predetermined time is still higher than the target speed. With the above configuration, brake control is performed stepwise in ascending order of brake performance, and thus smooth brake control of a vehicle can be achieved.

The time when the target speed is updated in the present disclosure is the timing when a brake operation or an accelerator operation is released by a driver after the operation is performed. Therefore, for example, even when a situation occurs in which the current speed cannot follow the target speed due to the influence of the tilt angle of a road surface (for example, a road with a down slope), a difference between the speeds is assumed to be smaller. Thus, regenerative braking or engine braking is applied first, and subsequently, for example, when a driver needs to depress the brake pedal because of a sudden appearance of an object or hard braking by the preceding vehicle, powerful braking force may be applied using a normal hydraulic brake device, and thus reliability (fail safe) can be improved.

In addition, the first to third embodiments of the present disclosure may adopt a configuration further including a reaction force control unit 75 which provides the accelerator pedal Ap with a footrest function by increasing a reaction force when the accelerator pedal Ap is depressed to a predetermined depressed position. In this configuration, the reaction force control unit 75 does not provide the accelerator pedal Ap with a footrest function while the cruise control of the vehicle is not performed by the cruise control unit 69, but provides the accelerator pedal Ap with a footrest function while the cruise control of the vehicle is performed by the cruise control unit 69.

With the above configuration, the reaction force control unit 75 provides the accelerator pedal Ap with a footrest function while cruise control of the vehicle is performed by the cruise control unit 69, and thus it is possible to implement a cruise control apparatus which can reduce the operational burden of a driver during the cruise control.

In addition, the first to third embodiments of the present disclosure may adopt a configuration in which the reaction force control unit 75 provides the accelerator pedal Ap with a footrest function, where the above-mentioned predetermined depressed position is a depressed accelerator pedal Ap position corresponding to the target speed set by the target speed setting unit 67.

Figure 9:
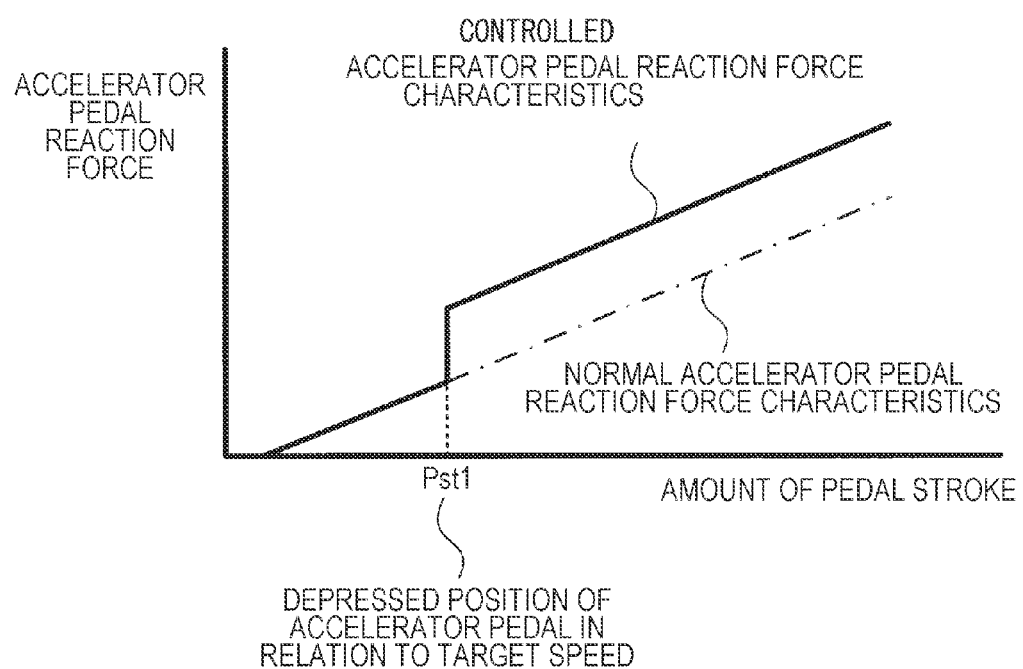
FIG. 9 is a graph illustrating accelerator pedal reaction force characteristics created by a reaction force control unit according to an embodiment of the present disclosure.

FIG. 9 is a graph illustrating accelerator pedal reaction force characteristics created by the reaction force control unit 75 according to an embodiment of the present disclosure. With the above configuration, the reaction force control unit 75 provides the accelerator pedal Ap with a footrest function while cruise control of the vehicle is performed by the cruise control unit 69, where the predetermined depressed position is a depressed accelerator pedal Ap position (see Pst1 in FIG. 9) corresponding to the target speed set by the target speed setting unit 67, and thus it is possible to implement the cruise control apparatus 11 which can reduce the operational burden of a driver, and has an excellent operability in terms of capability of quickly reflecting a driver's intention of acceleration.

In addition, the first to third embodiments of the present disclosure may adopt a configuration in which the target speed setting unit 67 updates the target speed to the speed of the vehicle based on an operation amount of depressing the accelerator pedal Ap when the operation amount exceeding the above-mentioned predetermined depressed position is acquired by the acceleration and deceleration operation amount acquisition unit 51, where the operation amount acquired by the acceleration and deceleration operation amount acquisition units 51, 53 is an accelerator operation amount due to the acceleration of a vehicle by a driver.

With the above configuration, when an operation amount of depressing the accelerator pedal Ap exceeding a predetermined depressed position is acquired by the acceleration and deceleration operation amount acquisition unit 51, the target speed setting unit 67 updates the target speed to the speed of the vehicle based on the operation amount, and thus it is possible to implement the cruise control apparatus 11 which is equipped with the accelerator pedal Ap having a footrest function.

In the first to third embodiments of the present disclosure, examples have been described in which the deceleration or acceleration of the vehicle is obtained by differentiating in time a vehicle speed detected by the vehicle speed sensor 41, however, the present disclosure is not limited to these examples. An aspect in which the vehicle is equipped with a separate acceleration and deceleration sensor, and the deceleration and acceleration of the vehicle is acquired from the acceleration and deceleration sensor is also included in the technical scope of the present disclosure.

In the first embodiment of the present disclosure, an example has been described in which the target speed is updated to the current speed at time t17 when the absolute value of the difference between the current speed and the target speed exceeds a predetermined value and the speed change is maintained in a predetermined range (predetermined speed range ΔV1) for more than a predetermined time interval (time interval of t16 to t17) as illustrated in FIG. 4D, however, the present disclosure is not limited to the example. The below-described five modifications may be adopted for determining the target speed for update. First, the target speed is updated to the average value in time of the current speed which is maintained in a predetermined range (predetermined speed range ΔV1) for more than a predetermined time interval (time interval of t16 to t17). Second, the target speed is updated to the average value of the maximum and minimum values of the current speed in the interval for constant speed drive determination (time interval of t16 to t17). Third, the target speed is updated to one of the maximum and minimum values of the current speed in the interval for constant speed drive determination (time interval of t16 to t17). Fourth, the target speed is updated to the current speed at start time t16 in the interval for constant speed drive determination (time interval of t16 to t17). Fifth, the target speed is updated to the current speed at any time in the interval for constant speed drive determination (time interval of t16 to t17). An aspect which uses the above modifications for updating the target is also included in the technical scope of the present disclosure.

In the second embodiment of the present disclosure, an example has been described in which the target speed is updated to the current speed at time t23 when the absolute value of the difference between the current speed and the target speed exceeds a predetermined value and the speed change is maintained in a predetermined range (predetermined speed range ΔV2) for more than a predetermined time interval (time interval of t22 to t23) as illustrated in FIG. 5C, however, the present disclosure is not limited to the example. The above-described five modifications may be applied to the second embodiment of the present disclosure for determining the target speed.

In the third embodiment of the present disclosure, an example has been described in which the navigation processing unit 21 is illustrated as the "curve detection unit" of the present disclosure, however, the present disclosure is not limited to the example. The "curve detection unit" of the present disclosure may be implemented by a combination of an image-capturing unit which captures an image ahead in the driving direction of the vehicle, and an image processing unit which performs image processing on the image captured by the image-capturing unit, and recognizes a curve ahead in the driving direction of the vehicle. In the above detailed description, several correspondences between specific elements of the preferred embodiments and terms indicated by double-quotation marks " " such as "unit." These correspondences are presented as mere examples in order to facilitate understanding, and thus, should not be interpreted as any limitation to the accompanying claims.

We claim:

1. A cruise control apparatus comprising:
   a current speed detector configured to detect a current speed of a vehicle;
   a target speed setting unit configured to set a target speed of the vehicle;
   an acceleration and deceleration operation amount acquisition unit configured to acquire an operation amount of acceleration or deceleration of the vehicle by a driver; and
   a cruise controller configured to perform cruise control of the vehicle so that the current speed follows the target speed,
   wherein the target speed setting unit monitors i) the operation amount acquired by the acceleration and deceleration operation amount acquisition unit or ii) change in the current speed detected by the current speed detector to perform a first determination of if the driver intends to maintain the vehicle speed at an intended speed different from the target speed, and if the first determination is affirmative, automatically updates the target speed to the intended vehicle speed,
   wherein the target speed setting unit decides the first determination is affirmative if a constant stable speed driving interval condition is satisfied,
   wherein the constant stable speed driving interval condition is satisfied if (i) is met:
   (i) a second determination and a third determination are both affirmative,
   wherein the second determination determines if an absolute value of a difference between the target speed and the current speed detected by the current speed detector exceeds a predetermined threshold value and the third determination determines if a change in the vehicle speed is maintained in a predetermined range for more than a predetermined time interval after the absolute value exceeding the threshold.

2. The cruise control apparatus according to claim 1, wherein the cruise controller performs cruise control of the vehicle such that the cruise control starts upon detecting that the acceleration operation or the deceleration operation is deactivated, and the cruise control stops upon detecting that the deceleration operation or the acceleration operation is activated.

3. The cruise control apparatus according to claim 1, further comprising a curved road detection unit configured to detect a curved road ahead in driving direction of the vehicle, wherein when the curved road detection unit detects that the vehicle has entered a curved road, and when the target speed setting unit detects that the operation amount acquired by the acceleration and deceleration operation amount acquisition unit exceeds a predetermined value, and then the operation is released, the target speed setting unit updates the target speed to the vehicle speed detected when the operation is released.

4. The cruise control apparatus according to claim 1, wherein the cruise controller further controls engine braking or regenerative braking, and a brake device, and the cruise controller performs deceleration control using the engine braking or the regenerative braking when the current vehicle speed detected by the current speed detection unit is higher than the updated target speed updated by the target speed setting unit, and performs braking control using the brake device when the current vehicle speed after performing the deceleration control continuously for a predetermined time is higher than the updated target speed.

5. The cruise control apparatus according to claim 1, further comprising a reaction force control unit configured to provide an accelerator pedal with a footrest function by increasing a reaction force when the accelerator pedal is depressed to a predetermined depressed position, wherein the reaction force control unit disables the footrest function while cruise control of the vehicle is not performed by the cruise control unit, but enables the footrest function while cruise control of the vehicle is performed by the cruise control unit.

6. The cruise control apparatus according to claim 5, wherein the predetermined depressed position is a depressed position of an accelerator pedal corresponding to the target speed set by the target speed setting unit.

7. The cruise control apparatus according to claim 6, wherein the operation amount acquired by the acceleration and deceleration operation amount acquisition unit is an amount of accelerator operation for acceleration of the vehicle by a driver, and when the acceleration and deceleration operation amount acquisition unit detects an operation of depressing the accelerator pedal exceeds the predetermined depressed position, the target speed setting unit updates the target speed.

8. The cruise control apparatus according to claim 1, wherein the cruise controller stops the cruise control if an acceleration pedal or a deceleration pedal is operated, and if the current speed is maintained within a predetermined speed range by operation of the acceleration pedal or the deceleration pedal after the vehicle has been accelerated or decelerated by the operation of the acceleration pedal or the deceleration pedal, the cruise controller resumes the cruise control by using the current speed as the target speed.

9. A cruise control method comprising:
a target speed setting step of setting a target speed of a vehicle;
a current speed detecting step of detecting a current speed of the vehicle;
an acceleration and deceleration operation amount acquisition step of acquiring an operation amount of acceleration or deceleration of the vehicle by a driver;
a target speed update step of monitoring, by using a processor, i) the operation amount acquired by the acceleration and deceleration operation amount acquisition step or ii) change in the current speed detected by the current speed detecting step to perform a first determination of if the driver intends to maintain the vehicle speed at an intended speed different from the target speed, and if the first determination is affirmative, automatically update the target speed to the intended vehicle speed, wherein the first determination is affirmative if a constant stable speed driving interval condition is satisfied, wherein the constant stable speed driving interval condition is satisfied if (i) is met:

(i) a second determination and a third determination are both affirmative, wherein the second determination determines if an absolute value of a difference between the target speed and the detected current speed exceeds a predetermined threshold value and the third determination determines if a change in the vehicle speed is maintained in a predetermined range for more than a predetermined time interval after the absolute value exceeding the threshold.

10. A non-transitory computer readable medium storing a program to cause a computer to execute a process comprising:
a target speed setting step of setting a target speed of a vehicle;
a current speed detecting step of detecting a current speed of the vehicle;
an acceleration and deceleration operation amount acquisition step of acquiring an operation amount of acceleration or deceleration of the vehicle by a driver;
a target speed update step of monitoring i) the operation amount acquired by the acceleration and deceleration operation amount acquisition step or ii) change in the current speed detected by the current speed detecting step to perform a first determination of if the driver intends to maintain the vehicle speed at an intended speed different from the target speed, and if the first determination is affirmative, automatically update the target speed to the intended vehicle speed, wherein the first determination is affirmative if a constant stable speed driving interval condition is satisfied, wherein the constant stable speed driving interval condition is satisfied if (i) is met:

(i) a second determination and a third determination are both affirmative, wherein the second determination determines if an absolute value of a difference between the target speed and the detected current speed exceeds a predetermined threshold value and the third determination determines if a change in the vehicle speed is maintained in a predetermined range for more than a predetermined time interval after the absolute value exceeding the threshold.

* * * * *